(12) United States Patent
Shukuri et al.

(10) Patent No.: US 6,387,460 B1
(45) Date of Patent: May 14, 2002

(54) GLASS PANEL

(75) Inventors: Kyoichi Shukuri; Hideo Yoshizawa; Naoto Horiguchi; Osamu Asano; Keiichiro Okajima; Tomonori Miura; Masao Misonou; Seiichiro Honjo, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/445,839

(22) PCT Filed: Apr. 28, 1999

(86) PCT No.: PCT/JP99/02313

§ 371 Date: Apr. 3, 2000

§ 102(e) Date: Apr. 3, 2000

(87) PCT Pub. No.: WO99/57074

PCT Pub. Date: Nov. 11, 1999

(30) Foreign Application Priority Data

| May 1, 1998 | (JP) | 10-122248 |
| May 13, 1998 | (JP) | 10-130209 |
| Sep. 17, 1998 | (JP) | 10-262827 |

(51) Int. Cl.[7] ............................................. C03C 27/06
(52) U.S. Cl. ..................... 428/34; 52/783.1; 52/786.1
(58) Field of Search ........................... 428/34; 52/783.1, 52/786.1

(56) References Cited

U.S. PATENT DOCUMENTS 5,005,557 A    4/1991  Bachli
5,643,644 A  * 7/1997  Demars ..................... 428/34

FOREIGN PATENT DOCUMENTS

| FR | 2 483 564 | 12/1984 |
| FR | 2 710 681 | 4/1995 |
| WO | 24398 | 10/1994 |

* cited by examiner

*Primary Examiner*—Blaine Copenheaver
*Assistant Examiner*—Christopher Paulraj
(74) *Attorney, Agent, or Firm*—Fulbright & Jaworski L.L.P.

(57) ABSTRACT

A glass panel including a pair of first and second glass sheets (1A, 1B) disposed with sheet faces thereof opposed to each other, a plurality of spacers (5) being interposed between the pair of glass sheets (1A, 1B) for forming a space (4) therebetween; and a sealing material (S) for bonding peripheral edges (3) of the glass sheets (1A, 1B) together for sealing the space (4), the sealing material having a lower fusing temperature than the softening point of the glass sheets (1A, 1B). Each spacer (5) is formed by disposing spacer-forming paste (11) in a predetermined shape on the sheet face of the glass sheet (1A, 1B). Or, the spacer (5) comprises a plurality of spacer bodies (51) two-dimensionally interconnected to each other via a connecting member (52).

3 Claims, 16 Drawing Sheets

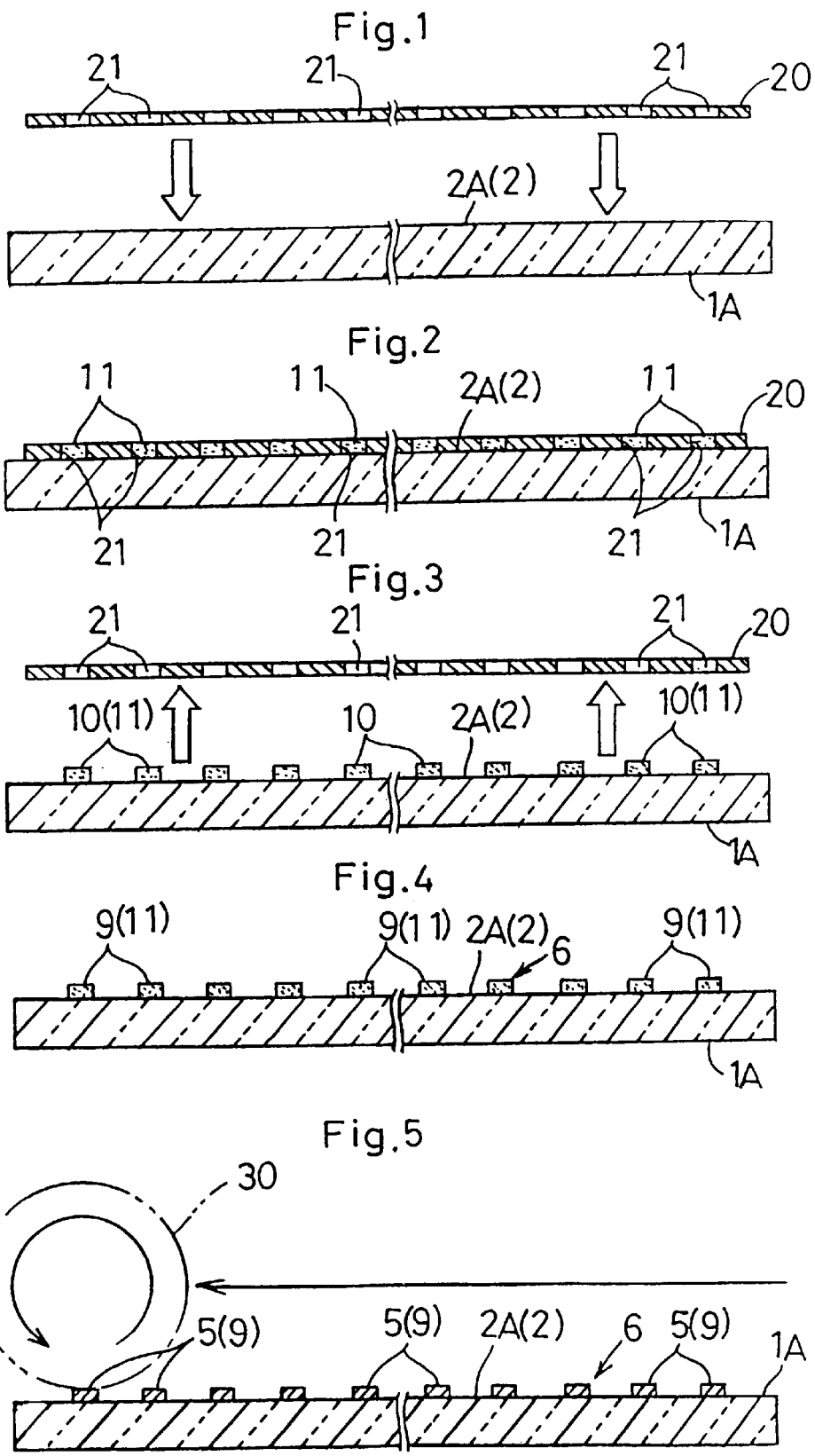

低融点ガラス
バインダ

GLASS PANEL

TECHNICAL FIELD

The present invention relates to a glass panel for improving heat insulating performance. The invention relates, more particularly, to a glass panel formed by assembling together a plurality of glass sheets with a plurality of spacers being interposed therebetween for forming a space and with outer peripheral edges of the plurality of glass sheets being sealed, and a method of manufacturing such glass panel, and relates further to the spacer for use in such glass panel.

BACKGROUND ART

Conventionally, such glass panel, as shown in FIGS. 48 and 49 for instance, is manufactured by disposing a plurality of spacers 5 made of cylindrical glass prepared in the form of spacers at predetermined positions on a spacer-disposing face 2A of a first glass sheet 1A, superposing a second glass sheet 1B thereon, and sealing outer peripheral edges 3 of the two glass sheets with a sealing material S made of low-melting glass.

Also, with the above-described glass panel, the inside of the space 4 is maintained under a pressure-reduced condition, in order to enhance the heat insulating performance and sound insulating performance. For this reason, the great number of spacers 5 are interposed between the first glass sheet 1A and the second glass sheet 1B so as to allow the atmospheric pressure acting on the outer surface of the first glass sheet 1A or second glass sheet 1B to be substantially uniformly born by the entire glass sheets, whereby breakage or cracking of the first glass sheet 1A and second glass sheet 1B may be avoided.

For manufacturing a glass panel, generally, after the spacers 5 are disposed on the surface of the first glass sheet 1A, the second glass sheet 1B is superposed thereon. With the conventional glass panel, the disposing operation of the spacers 5 at predetermined positions on the first glass sheet 1A is done by a worker's manual operation of disposing the spacers 5 one by one on the first glass sheet 1A or by using a suction-conveying device operable to suck the plurality of spacers (5) to be disposed within a predetermined area at one time and then to place them on the first glass sheet 1A.

Further, with the above-described conventional art, a great number of spacers 5 need to be manufactured in advance and these spacers 5 need to be placed with a predetermined distance therebetween on the sheet face of the first glass sheet 1A. Moreover, a separate operation is needed for bonding these spacers 5 on the first glass sheet so as to prevent movement of the spacers. Hence, the handling of the spacers 5 would be troublesome and the manufacturing process of the glass panel would be complicated.

For example, with the conventional glass panel manufacturing method described above, the mere disposing operation of the spacers 5 on the first glass sheet 1A cannot prevent inadvertent displacement or tumbling of the spacers 5 in the course of the superposing operation of the second glass sheet 1B unless the spacers 5 are fixed in advance. Therefore, the superposing operation of the two glass sheets 1A, 1B is troublesome, hence, the productivity is poor. Then, it is conceivable to bond the spacers 5 on the first glass sheet 1A However, it is not easy to bond such great number of small objects.

In view of the above, as shown in FIGS. 42 through 44 for example, the convention has proposed an alternative method (e.g. the European patent Serial No. 0047725), in which case spacer-forming paste 11 which is prepared by mixing together low-melting glass frit and caking additive is caused to adhere, in the form of paste-formed members 10 having predetermined dimensions, to the respective predetermined positions on the two glass sheets 1A, 1B (see FIG. 42), then after placing the leading ends of these paste-formed members 10 into abutment with each other, the members are baked (see FIG. 43), so as to be combined together into the spacers 5, and also these spacers 5 are bonded to the respective glass sheets 1A, 1B (see FIG. 44).

However, in order to realize this proposal, it is necessary to arrange the small paste-formed members 10 with high precision on the faces 2 of the opposed glass sheets 1A, 1B on the side of the space 4. That is, as shown in FIG. 45 for instance, if there occurs error in the relative positioning between the two glass sheets 1A, 1B, this will result in misalignment as shown in FIG. 46 between the opposed paste-formed members 10. As a result, there will be formed some misaligned spacers 5 at mid-positions as shown in FIG. 47. With such misalignment, there is the risk of the spacers 5, when used, being broken at such misaligned positions. Moreover, if there is extreme misalignment between the opposed paste-formed members 10, the spacers 5 bonded to the opposed glass sheets 1 will not be bonded with each other, so that they will fail to function properly as spacers 5. Therefore, very careful positioning operation is needed. Hence, when the two glass sheets 1A, 1B are assembled together, a precise positioning operation is needed and the operation is not easy.

Also, the two glass sheets 1A, 1B after being assembled together are completely restricted in position relative to each other by means of the spacers 5. Then, if there occurs deformation of the glass panel, such as warping thereof, due to an external force, e.g. wind pressure, acting on the glass panel, this will cause mutual displacement between the two glass sheets 1A, 1B, so that the spacers 5 may be broken or the glass sheets 1 may be damaged.

Moreover, of the conventional methods described above, in the case of the worker's manual operation of disposing all of the spacers 5 on the first glass sheet 1A, this operation is very troublesome and the production efficiency of the glass panel is low.

On the other hand, in the case of disposing the spacers 5 by using the suction-conveying apparatus or the like, such suction-conveying apparatus needs to be prepared separately. Moreover, a plurality of such suction-conveying apparatuses need to be prepared in order to cope with all possible sizes of glass sheets. Hence, there occur such inconveniences as disadvantageous diversification of the required manufacturing system, necessity of maintenance of the system, which all lead to increase in the required costs. Further, in this case, some of the spacers 5 disposed on the first glass sheet 1A may not be disposed properly, with improper inclined or lateral orientation. Thus, there was a limit in possible improvement of the efficiency of disposing operation of the spacers 5.

The present invention has been made in view of the above-described state of the art and its object is to provide a glass panel which is easy to manufacture and has superior productivity and which can prevent damage of the glass sheets and a method of manufacturing such glass panel and also to provide spacers for use in such glass panel.

DISCLOSURE OF THE INVENTION

The characterizing features of the glass panel according to the present invention are as follows.

A glass panel relating to claim 1, as shown mainly in FIG. 9, comprises a pair of first and second glass sheets disposed with sheet faces thereof opposed to each other, a plurality of spacers interposed between the pair of glass sheets for forming a space therebetween, and a sealing glass for bonding peripheral edges of the glass sheets together for sealing the space, the sealing glass having a fusing temperature lower than a softening point of the glass sheets, wherein each spacer is formed by disposing spacer-forming paste in a predetermined shape on the sheet face of the glass sheet and then baking the paste, said spacer-forming paste containing glass component which has a fusing temperature lower than the softening point of the glass sheets and a softening point higher than a fusing temperature of the sealing glass.

That is to say, the spacer fused to glass sheets may be formed by disposing the spacer-forming paste containing a glass component having a lower fusing temperature than the softening point of the glass sheets in a predetermined shape on the sheet face of the glass sheet and then baking this paste. Thus, there is no necessity of manufacturing a great number of spacers in advance, and the spacers may be easily bonded and fixed in position with a predetermined distance therebetween on the sheet face of the glass sheets.

Also, since the glass component contained in the paste has a softening point higher than the fusing temperature of the sealing glass, there is no risk of the spacers being softened and deformed when the sealing glass is heated for bonding together the peripheral edges of the two glass sheets.

Accordingly, there is no necessity of manufacturing a great number of spacers in advance, and there is no necessity, either, of disposing these spacers on the sheet face of the glass sheet with a predetermined distance. In addition, the separate bonding operation for bonding these spacers to the glass sheets is not needed, either. As a result, handling of the spacers is easy and the glass panel may be manufactured easily.

Further, as there is no risk of the spacers being softened and deformed in the course of bonding operation of the peripheral edges of the two glass sheets together with the sealing glass, the distance between the two glass sheets may be maintained properly, so that a desired heat-insulating performance may be readily assured.

A glass panel relating to claim 2, as shown in FIGS. 1–5, is characterized in that the spacer is formed by baking the paste which is disposed on the sheet face of the first glass sheet alone.

That is to say, as the space between the two glass sheets is formed by disposing the spacer which is fused only to the first glass sheet, relative displacement between the spacer and the second glass sheet may be allowed even if the glass panel is deformed by warping.

Accordingly, even when the glass panel is warped, there is less risk of this glass panel being broken.

A glass panel relating to claim 3 is characterized in that the glass component contained in the paste has a lower lead content and a higher silicon content than the sealing glass.

Accordingly, it is easy to set the softening point of the spacer to a higher temperature than the fusing temperature of the sealing glass.

A method of manufacturing a glass panel relating to claim 4 comprises the steps of: preparing spacer-forming paste capable of forming spacers; forming and disposing the spacer-forming paste in a predetermined shape on the space-side face, i.e. spacer-disposing face, of a first glass sheet; subsequently effecting a predetermined solidifying operation on each spacer-forming paste so as to form a plurality of pre-spacer forming elements; effecting a height-adjusting shaping operation on respective contacting ends capable of contacting a second glass sheet of the plurality of solidified pre-spacer forming elements into a predetermined height relative to the spacer-disposing face; and assembling the second glass sheet with the first glass sheet with a space-side face of the second glass sheet being opposed to the height-adjusted shaped contacting ends.

With this method, the manufacture of the glass panel may be facilitated and also the damage of the glass panel may be avoided. That is, because the spacer-forming paste is disposed on the spacer-disposing face, i.e. the space-side face, of the first glass sheet, the assembling operation of the two glass sheets does not require precise mutual positioning. This is because the spacers may only be distributed properly on the spacer-disposing face. Further, the spacer-forming paste is subjected to the predetermined solidifying operation (e.g. a baking operation in case e.g. a low-melting glass paste is employed) to be formed into the spacers. Then, if each of these spacers is subjected to the height-adjusting shaping operation (e.g. in case the above-described paste is employed, the contacting ends of the pre-spacer forming elements after the baking operation thereof will be heated again and pressed at the softening temperature) to obtain a predetermined height relative to the spacer-disposing face, when the second glass sheet is assembled by sealing the outer peripheral edges, there will occur no such trouble of only a limited number of the spacers coming into contact with the second glass sheet. As a result, there may be obtained a glass panel having a stable construction. Moreover, as the spacers are not bonded to the space-side face of the second glass sheet, relative movement is allowed between the spacers and the second glass sheet. Accordingly, deformation, e.g. warping, of the glass panel may be effectively absorbed through the mutual displacement between the spacers and the second glass sheet.

A glass panel manufacturing method relating to claim 5, as shown in FIG. 8 for instance, is characterized in that the height-adjusted, shaped contacting end of the spacer in claim 4 is then subjected to a grinding operation to form convex and concave portions at this contacting end.

With this method, in addition to the effect achieved by the method of claim 4, the heat-transfer resistance between the spacer and the second glass sheet may be enhanced, thereby to restrict heat conduction via the spacer. As a result, stress concentration may be avoided for effectively preventing development of cracks in the glass sheet.

That is to say, as shown in FIG. 8, as the contact portions in the form of convex portions are formed in the contacting end of the spacer, the contact area of the contact portions relative to the second glass sheet may be reduced. Moreover, since substantially entire area of the contacting end including the concave portions of the contacting end of the spacer functions as the contact area for contacting the second glass sheet, it becomes possible to avoid stress concentration to the second glass sheet. Further, with such reduced contact area, it becomes also possible to increase the heat-transfer resistance between the second glass sheet and the spacer.

A method of manufacturing a glass panel relating to claim 6, as illustrated in FIGS. 1 through 7, comprises the steps of: preparing spacer-forming paste capable of forming spacers; forming and disposing the spacer-forming paste in a predetermined shape on the space-side face, i.e. spacer-disposing face, of a first glass sheet (see FIG. 3); subsequently effecting a predetermined semi-solidifying operation on each spacer-forming paste so as to form a plurality of semi-solidified pre-spacer forming elements (see FIG. 4); effecting a height-adjusting shaping operation on respective contacting ends capable of contacting a second glass sheet of the plurality of pre-spacer forming elements into a predetermined height relative to the spacer-disposing face (see FIG. 5); subjecting each said height-adjusted pre-spacer forming element to a predetermined solidifying operation to form it into a spacer; and assembling the second glass sheet with the first glass sheet 1A (see FIG. 7) with a space-side face of the second glass sheet being opposed to the height-adjusted shaped contacting ends (see FIG. 6).

With this method, the manufacture of the glass panel may be facilitated and also the damage of the glass panel may be avoided. That is, as illustrated in FIGS. 1 through 7, because the spacer-forming paste is disposed on the spacer-disposing face, i.e. the space-side face, of the first glass sheet, the assembling operation of the two glass sheets does not require precise mutual positioning. This is because the spacers may only be distributed properly on the spacer-disposing face. Further, the spacer-forming paste is subjected to the predetermined semi-solidifying operation (e.g. in case a low-melting glass paste is employed, the paste is baked and then is maintained at a temperature higher than the softening point so as to maintain its semi-solidified state) to be formed into the semi-solidified pre-spacer forming elements. Then, if each of these is subjected to the height-adjusting shaping operation (the pre-spacer forming element is pressed, under a temperature condition in which the element is slightly softened, by the space-side face of the second glass sheet, so as to form it simultaneously with the assembly operation thereof to the first glass sheet and the sealing operation of the outer peripheral edges) to obtain a predetermined height relative to the spacer-disposing face, when the second glass sheet is assembled by sealing the outer peripheral edges, there will occur no such trouble of only a limited number of the contacting ends coming into contact with the second glass sheet. As a result, there may be obtained a glass panel having a stable construction.

Moreover, as the spacers are not bonded to the space-side face of the second glass sheet, the contacting end of the spacer and the space-side face of the second glass sheet are free from each other, so that relative movement is allowed between the spacers and the second glass sheet. Accordingly, deformation, e.g. warping, of the glass panel may be effectively absorbed through the mutual displacement between the spacers and the second glass sheet.

A glass panel manufacturing method relating to claim 7, as illustrated in FIGS. 1 through 5 for instance, is characterized in that the spacer-forming paste is mixed by adding a binder to the low-melting glass having a lower fusing temperature than the softening point of the glass sheet in any one of claims 4 through 6; this spacer-forming paste is baked under a predetermined baling temperature together with the first glass sheet to be formed into the plurality of pre-space forming elements; and the contacting ends are height-adjusted by pressing while these pre-spacer forming elements are maintained at the softening temperature of the pre-spacer forming elements which is lower than the baking temperature.

In this regard, the fusing temperature of the low-melting glass refers to such a temperature as the viscosity of the low-melting glass becomes fluidized, e.g. the viscosity becomes below $10^5$ poise.

With this method, in addition to the effects achieved by the methods of claims 4–6, there is obtained a further effect that the spacer may be formed into the predetermined shape while this spacer is fused to the second glass sheet.

That is to say, as shown in FIGS. 1 through 5, for forming the spacers, the pre-spacer forming elements fused to the second glass sheet may be formed by baking the spacer-forming paste comprising the low-melting glass having a fusing temperature lower than the softening point of the glass sheets. Therefore, it is possible then to effect the height-adjusting shaping operation of the spacer by pressing the pre-spacer forming element while it is maintained at its softening temperature which is lower than the baking temperature.

A glass panel manufacturing method relating to claim 8, as illustrated in FIG. 10 for instance, is characterized in that the spacer-forming paste is prepared by adding to the low-melting glass particles of convex forming elements having a heat-resistant temperature higher than the softening temperature of the pre-spacer forming elements in claim 7 and them together.

With this method, in addition to the effect achieved by the method of claim 7, it becomes also possible to form the convex portions in the contacting end of the spacer without any particular working.

That is, as illustrated in FIG. 10, since the convex forming element has a higher softening point than the fusing temperature of the pre-spacer forming element comprised of the low-melting glass constituting the spacer-forming paste, the particles of the convex forming elements can form convex portions on the surface of the contacting end of the spacer, when the low-melting glass is solidified.

A glass panel manufacturing method relating to claim 9, is characterized in that in the height-adjusting shaping step of the contacting end according to any one of claims 4–7, the contacting end is shaped into a flat smooth face as shown in FIGS. 1 through 5 for instance.

With this method, in addition to the effects achieved by the methods of claims 4–7, there is obtained still further effect that damage of the spacers and glass sheetes may be prevented.

That is to say, as shown in FIGS. 1 through 5, as the contacting end of each spacer for contacting the second glass sheet is formed as a flat smooth face, the sliding resistance of the contacting end against the space-side face of the second glass sheet is reduced, so that they may readily slide against each other in the case of deformation of the glass panel. As a result, the external force affecting the spacer during deformation of the glass panel may be reduced advantageously.

Moreover, the height-adjusting shaping operation of the pre-spacer forming element may be carried out simply by pressing it into a flat surface. Therefore, this shaping operation may be very easy.

A glass panel manufacturing method relating to claim 10, as shown in FIGS. 2 and 7 for instance, comprises the steps of: preparing spacer-forming paste capable of forming spacers; forming and disposing the spacer-forming paste in a predetermined shape and at a plurality of predetermined positions on the space-side face, i.e. spacer-disposing face, of a first glass sheet; effecting a height-adjusting shaping operation (e.g. by means of press-rolling using a roller (not shown)) on respective contacting ends capable of contacting a second glass sheet into a predetermined height relative to the spacer-disposing face; subsequently effecting a predetermined solidifying operation on each spacer-forming paste so as to form a plurality of spacers; and assembling the second glass sheet with the first glass sheet with a space-side face of the second glass sheet being opposed to the height-adjusted shaped contacting ends (see FIG. 7).

With this method, the manufacture of the glass panel may be facilitated and also the damage of the glass panel may be avoided.

That is, as illustrated in FIGS. 2 and 7, because the spacer-forming paste is disposed on the spacer-disposing face, i.e. the space-side face, of the first glass sheet, the assembling operation of the two glass sheets does not require precise mutual positioning. This is because the spacers may only be distributed properly on the spacer-disposing face.

Further, as the spacer-forming paste disposed on the spacer disposing face is formed into the predetermined shape while being height-adjusted so as to obtain a predetermined height relative to the spacer-disposing face (e.g. if the spacer-forming paste is height-adjusted by means of e.g. screen printing method in accordance with the thickness of the screen during the printing operation), then, when the spacers are formed by baking, there will occur no such inconvenience as only some of the contacting ends come into contact with the second glass sheet when the second glass sheet is assembled with sealing of the outer peripheral edges. As a result, there may be obtained a glass panel having a stable construction.

Moreover, as the spacers are not bonded to the space-side face of the second glass sheet, relative movement is allowed between the spacers and the second glass sheet. Accordingly, deformation, e.g. warping, of the glass panel may be effectively absorbed through the mutual displacement between the spacers and the second glass sheet.

A glass panel manufacturing method relating to claim 11, as illustrated in FIG. 8, is characterized in that in the height-adjusting shaping step of the contacting ends according to any one of claim 4, claims 6–8 and claim 10, convex and concave portions are formed in the contact end and the convex portions are shaped into the predetermined height.

With this method, in addition to the effects achieved by the methods of any one of claim 4, claims 6–8 and claim 10, there is achieved still further effect that the manufacturing process may be simplified while maintaining the required precision in the height of the contact portion.

That is to say, as illustrated in FIG. 8, the contacting end is ground to form the convex portions to form the convex portions in the original surface. Hence, the height-adjusting shaping operation may be carried out prior to the grinding operation. And, this height-adjusting shaping operation does not require press-shaping of both of the convex and concave portions, so that the shaping operation may be facilitated while the required height precision is maintained. As a result, the shaping operation of the contacting end may be facilitated.

A glass panel spacer relating to claim 12, as shown in FIG. 32, comprises a plurality of spacer bodies two-dimensionally interconnected to each other via a connecting member.

According to this construction, by interconnecting a plurality of spacer bodies in advance, these spacer bodies may be disposed at one time at the predetermined positions. So that, the disposing operation of the spacers may be carried out efficiently and consequently the production efficiency of the glass panel may be improved.

A glass panel spacer relating to claim 13 is characterized in that the connecting member may be shrunk or eliminated by means of heating.

If the connecting member is shrunk by means of heating as this construction, the connecting member may be less conspicuous when the glass panel is completed, whereby the transparency of the glass panel may be improved.

A glass panel spacer relating to claim 14 is characterized in that the connecting member may be dissolved by means of a solvent.

If the connecting member can be dissolved by means of a solvent, the connecting member may be removed entirely when the glass panel is completed, so that a glass panel having highest possible transparency may be obtained.

BRIEF DESCRIPTION OF THE DRAWINGS

FIGS. 1 through 5 are descriptive views illustrating one example of an assembling process of a glass panel.

BEST MODES OF EMBODYING THE INVENTION

First Embodiment

A glass panel relating to the present invention will be described next with reference to the accompanying drawings. The manufacturing method of this glass panel is a method of manufacturing a glass panel P comprised of two glass sheets as shown in FIG. 9 for example.

Figure 6:
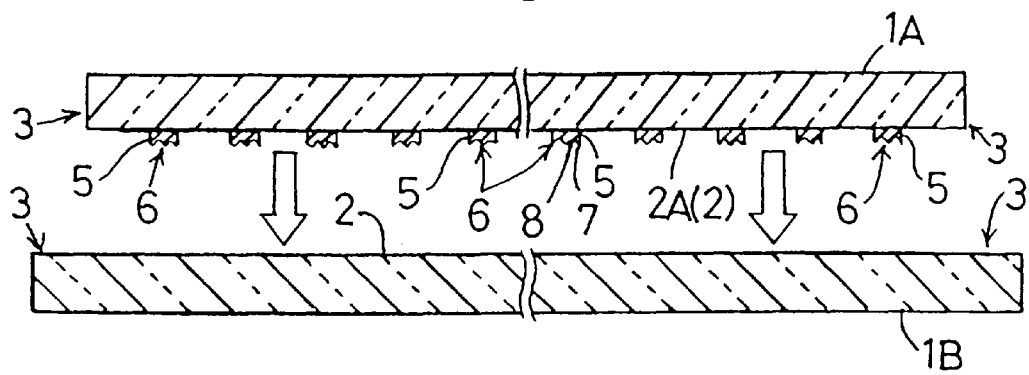
FIGS. 6 and 7 are descriptive views illustrating one example of an assembling process of a glass panel.
Figure 7:
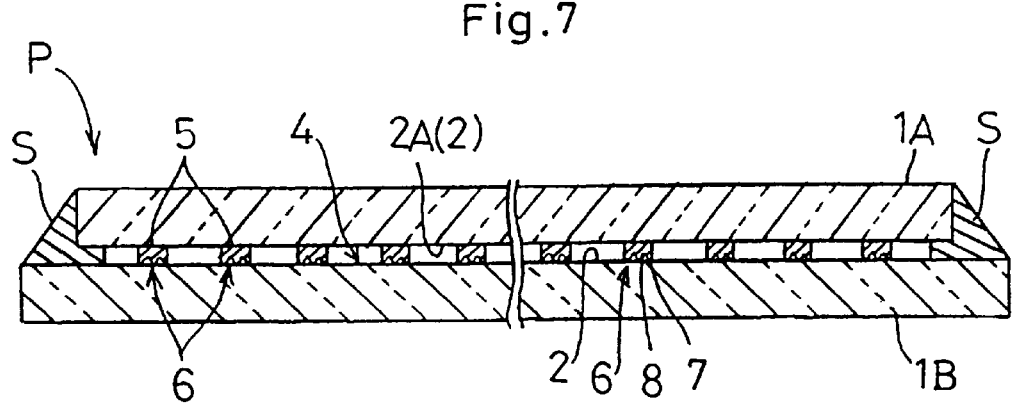
Figure 8:
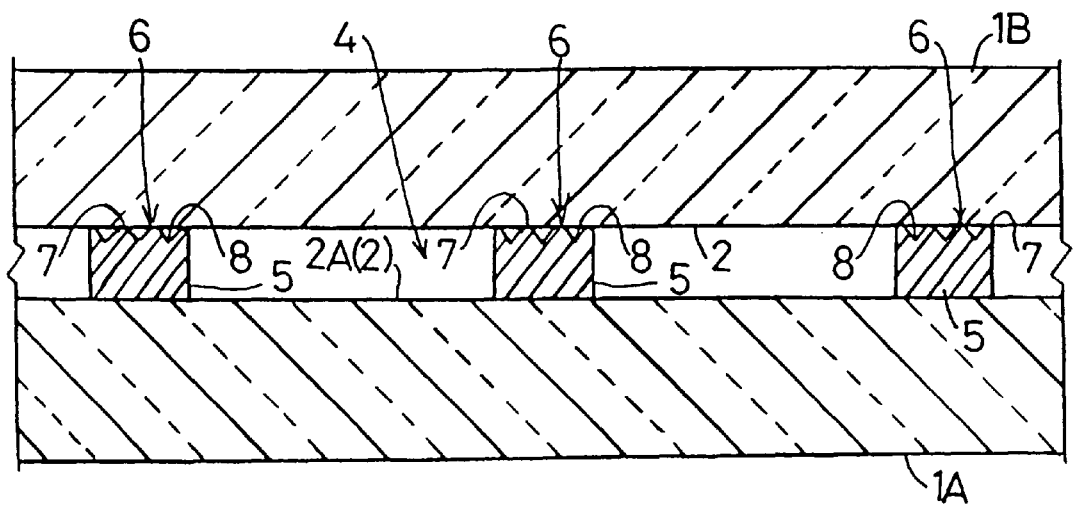
FIG. 8 is a section view of principal portions showing spacers in details.
Figure 9:
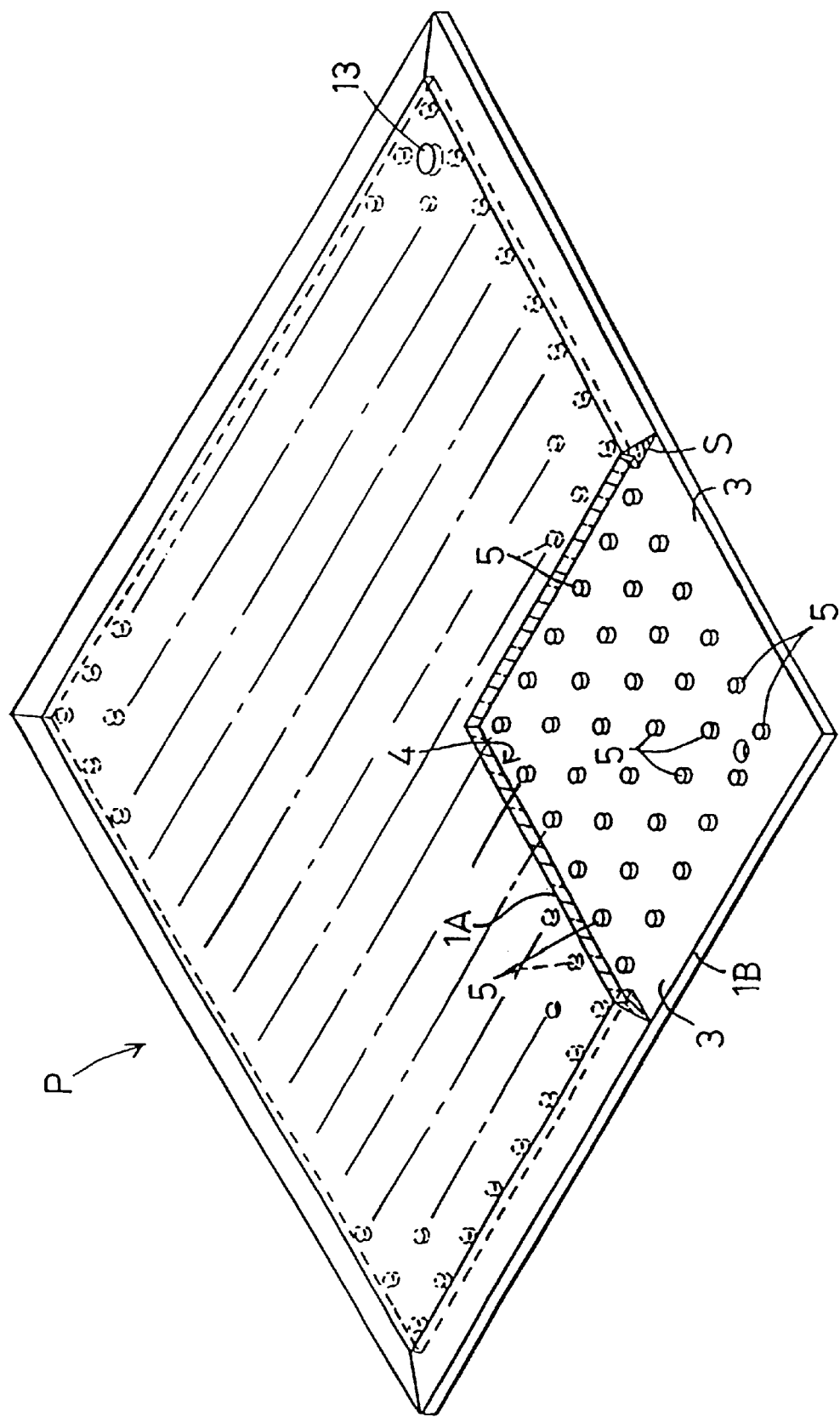
FIG. 9 is a partially cutaway perspective view showing an example of the glass panel.
Figure 48:
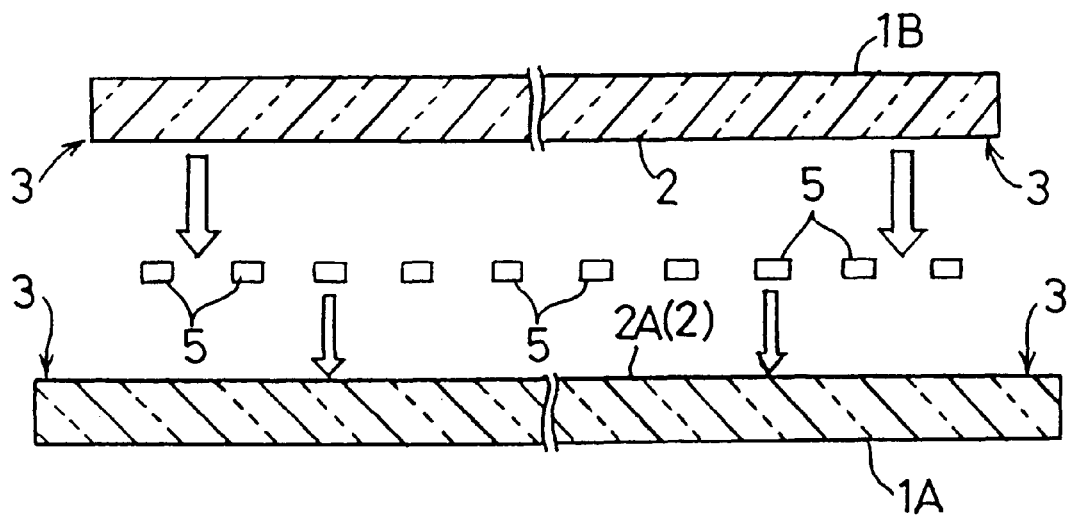
FIGS. 48 and 49 are section views for illustrating a conventional glass panel manufacturing method.
Figure 49:
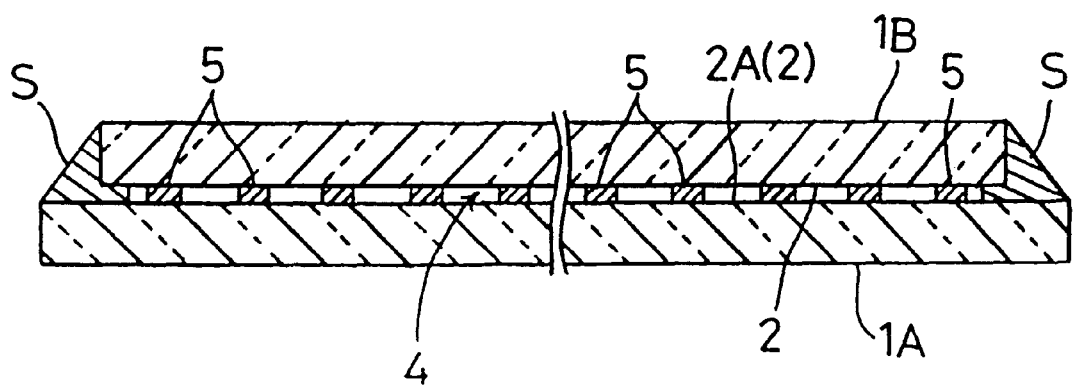

The glass panel P shown in FIG. 9 includes two glass sheets, i.e. first glass sheet 1A and second glass sheet 1B, a plurality of spacers 5 interposed between the sheets for forming a space 4 therebetween, and outer peripheral edges 3 are sealed for assembling the two glass sheets 1A, 1B together. Although this glass panel P has a similar vertical section to that shown in FIGS. 48 and 49 described hereinbefore in the description of the prior art, the spacers 5 thereof are fixed to the first glass sheet 1A.

An example of method of manufacturing the glass panel P will be described next.

Figure 16:
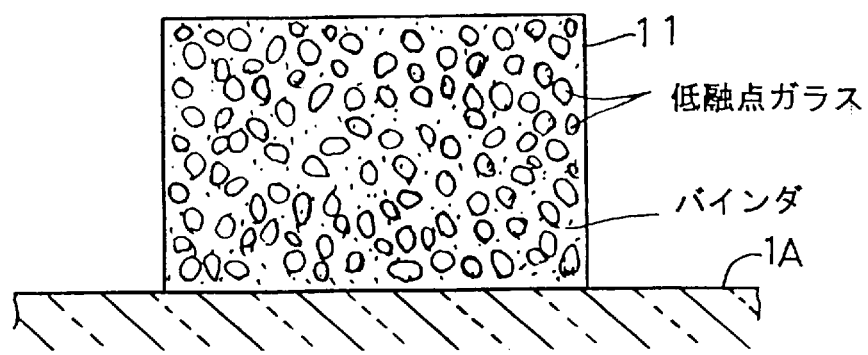
FIG. 16 is a descriptive view showing an example of construction of glass paste.

First, spacer-forming paste 11 capable of forming the spacers 5 is prepared in advanced. This paste 11 is obtained by mixing and kneading together glass frit formed of fine particles of low-melting glass having a lower fusing temperature than the softening point of the two glass sheets 1A, 1B with a binder made of an organic agent or the like (see FIG. 16). When this paste 11 is heated up to the fusing temperature of the low-melting glass, the organic agent will be evaporated in association with the rise of the temperature and at the same time the fine particles of the low-melting glass are fused into glass to form pre-spacer forming elements 9. If the low-melting glass is crystallizable, the glass will be crystallized subsequently, so that the softening point thereof too will be raised. The fusing temperature described above refers to such temperature as the low-melting glass becomes fluidized. Such fluidization generally occurs at a temperature where its viscosity becomes below $10^5$ poise, which temperature is e.g. about 400 to 600° C. in the case of common low-melting glass. Accordingly, when low-melting glass as sealing material S is heated and fused for sealing the outer peripheral edges 3 in the subsequent step of sealing these outer peripheral edges 3 of the glass panel P, there is no risk of the once-formed spacers 5 becoming softened or fluidized again in the course of the operation within the furnace.

The spacer-forming paste 11 is formed in a predetermined shape and disposed at predetermined positions on a spacer-disposing face 2A of the first glass sheet 1A which face will be located on the side adjacent the space 4 when the first glass sheet 1A is assembled into the glass panel P. For this disposing operation, if the screen printing method is employed, then, a great number of paste-formed members 10 may be shaped in the predetermined size and disposed at one time at the predetermined positions. Incidentally, the paste-formed members 10 are to be vitrified through the baking process into pre-spacer forming elements 9. For example, a screening plate having a thickness of 20 to 30 $\mu$m and defining a number of mimeographing holes 21 of 0.2 to 2.0 mm diameter in a grating pattern with a predetermined distance of about 20 mm is affixed to the spacer-disposing face 2A; then, the paste 11 will be rubbed onto the spacer-disposing face 2A through this screening plate 20. When this screening plate 20 is removed from the spacer-disposing face 2A, the paste-formed members 10 having the predetermined size are formed on the spacer-disposing face 2A.

The thickness of the screening plate 20, the diameter and disposing distance of the mimeographing holes 21 to be defined through this screening plate 20 will be appropriately determined, depending on e.g. the designing conditions of the glass panel P, such as the composition of the paste 11, the properties of the low-melting glass as the basic material. Incidentally, the baking process refers to heating the low-melting glass to a temperature higher than its fluidizing temperature to fuse the frit of the low-melting glass and then cooling it. When an ordinary low-melting glass is employed, it is heated to 400 to 600° C. and then cooled.

Thereafter, each spacer-forming paste 11 disposed as the paste-formed member 10 on the spacer-disposing face 2A of the glass sheet 1 is subjected to a predetermined solidifying operation, whereby a plurality of pre-spacer forming elements 9 are formed. For this solidifying operation, the glass sheet retaining the paste-formed members 10 will be e.g. charged into a furnace maintained at the baking temperature of 400 to 600° C. and this will be maintained inside the furnace until the plurality of paste-formed members 10 will be vitrified into the pre-spacer forming elements 9.

Subsequently, the other ends of the pre-spacer forming elements 9 whose one ends are formed and fused to the first glass sheet 1A will be shaped into contacting ends 6 capable of coming into contact with the second glass sheet 1B constituting the glass panel P. That is to say, after the first glass sheet 1A is taken out of the furnace, each pre-spacer forming element 9 will be height-adjusted and shaped to obtain a predetermined height relative to the spacer-disposing face 2A, whereby the spacer 5 is formed.

Next, this step will be described by way of a specific example thereof. The temperature of the pre-spacer forming elements 9 fused to the glass sheet 1 taken out of the furnace is lowered by e.g. 40 to 70° C. from the above-described baking temperature so as to maintain the softening temperature (e.g. 450° C.) of the pre-spacer 5 forming elements at which the pre-spacer forming elements 9 are deformable; and under this condition, a roller 30 having fine knurled pattern on its surface will be moved along the spacer disposing face 2A with maintaining the surface of this roller at a predetermined distance (e.g. 20 $\mu$m) from the spacer-disposing face 2A, so as to press the contacting ends 6 of the pre-spacer forming elements 9 for shaping and adjusting them into the predetermined height, whereby the spacers 5 are formed.

Figure 17:
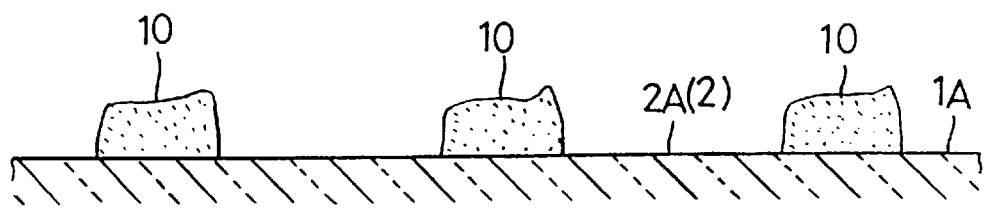
FIG. 17 is a descriptive view showing a shape of paste-formed member.

The reason why the height-adjusting shaping operation is effected is that the surface of the paste-formed member 10 formed by screen-printing of the paste 11 is not formed parallel to the spacer-disposing face 2A of the glass sheet 1. Rather, this surface of the paste-formed member 10 is formed e.g. with an upward projection as shown in FIG. 17. Therefore, if it is interposed as it is between the two glass sheets 1A, 1B, only the projecting portion will come into local contact with the face 2 of the second glass sheet 1B on the side of the space 4, so that there may occur such inconvenience as development of crack in the second glass sheet 1B.

Incidentally, it is preferred that the surface having the knurled pattern of the roller 30 have surface roughness corresponding to the surface roughness of a coated abrasive No. 8000.

With the above-described roll pressing of the contacting ends 6 with the roller 30 having the knurled pattern, in the height-adjusting shaping operation of the contacting ends 6, convex portions 7 and concave portions 8 may be formed at each contacting end 6, so that the projecting portions 7 may obtain the predetermined height. That is, since the knurled pattern makes it easy to maintain the width of the space 4 constant, the peak heights of the peaks in the form of the convex portions 7 formed at the contacting end 6 press-rolled with the roller 30 may be maintained substantially constant.

Alternatively, this height-adjusting shaping operation of the pre-spacer forming elements 9 may be done by pressing of the paired glass sheets when the paired glass sheets are superposed and the sealing paste along the periphery thereof is baked.

In the manner described above, onto the first glass sheet 1A on whose spacer-disposing face 2A the spacers 5 are formed and disposed, the second glass sheet 1B will be superposed with its face 2 on the side of the space 4 being oriented in opposition to the height-adjusted contacting ends 6 and then the glass sheets are assembled together, whereby the glass panel P is formed. More particularly, while the second glass sheet 1B is maintained with its face 2 on the side of the space 4 being oriented upward, the first glass sheet 1A will be superposed thereon with the spacers 5 being oriented downward, and then the paste 11 made of the low-melting glass as the sealing member S is disposed along the entire outer peripheral edges 3 thereof and this is then fused between the second glass sheet 1B and the outer peripheral edges 3 so as to seal therebetween. In the course of this, a communicating hole 13 (see FIG. 9) communicating with the space 4 may be provided, and an evacuating operation is effected through this communicating hole 13 to evacuate air from inside the space 4, then, the communicating hole 13 is sealed, whereby a vacuum glass panel P may be manufactured. In this case, it is preferred that the degree of vacuum inside the space be below $10^{-2}$ torr. Incidentally, if this is further lowered below $10^{-4}$ torr, the heat-insulating performance may be further improved.

As the manufacturing process is constructed as described above, in the disposing step of the paste-formed members 10 for forming the spacers 5, all of the paste-formed members 10 may be shaped at one time by the screen printing method and if their baking operation is effected inside the furnace, the pre-spacer forming elements 9 may be disposed at one time on a plurality of glass sheets. And, if the sealing and assembling steps of the outer peripheral edge 3 after the superposing operation with the second glass sheet 1B too are effected inside a vacuum furnace, in this case too, a plurality of glass panels P may be manufactured. Hence, this method is suitable for mass production. Especially, if crystallized glass is employed for the spacers 5, this will significantly raise the softening point of the spacers 5 relative to the softening point when the pre-spacer forming elements 9 are formed. So that, it becomes unnecessary to employ, as the sealing member S, a low-melting glass having a particularly low fusing temperature.

With the glass panel P manufactured by the glass panel P manufacturing method according to the present invention, as described above, the one end of each spacer 5 is fixed to the first glass sheet 1A and the other contacting end thereof is disposed to be movable relative to the second glass sheet 1B. Therefore, even if the panel, when used in a window pane, is warped due to e.g. wind pressure, the spacers 5 will be displaced relative to the second glass sheet 1B, whereby damage of the glass sheets 1 which would occur otherwise due to the provision of the spacers 5 may be avoided advantageously.

Further, as the convex portions 7 and concave portions 8 are formed in the contacting end 6 and the convex portions 7 function as the contacting portions for coming in to contact with the second glass sheet 1B, the heat-transfer resistance at its border area may be increased, whereby the heat-insulating performance of the glass panel P may be improved.

Incidentally, the spacer 5 according to this first embodiment may alternatively shaped as described next.

<1> The method of forming the convex portions 7 and the concave portions 8 is not limited to that described in the foregoing embodiment. Instead, the height-adjusted and shaped contacting end 6 may be ground to form concave portions 8 in the form of grooves and convex portions 7 in the form of ridges between the grooves.

Further alternatively, the surface of the original contacting end 6 remaining therebetween may be formed into the convex portions 7.

Further, in the height-adjusting shaping operation of the contacting end 6, this contacting end 6 may be shaped into a flat smooth surface. Then, this flat smooth surface is ground to form a groove which in turn forms the concave portion 8 and the remaining portion of the flat smooth surface will form the convex portion 7. Then, this convex portion 7 will be height-adjusted with high precision.

<2> Instead of height-adjusting shaping the pre-spacer forming element 9, the height-adjusting shaping operation may be carried out by pressing the paste-formed members 10 disposed on the first glass sheet 1A For instance, this height-adjusting shaping operation may be carried out by pressing it with the second glass sheet 1B in the course of seal baking operation.

Figure 10:
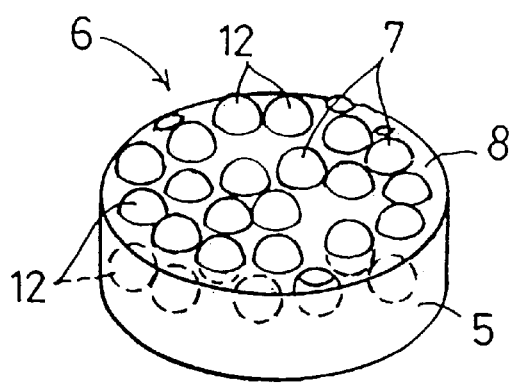
FIGS. 10 through 15 are perspective views showing examples of spacer shapes.
Figure 11:
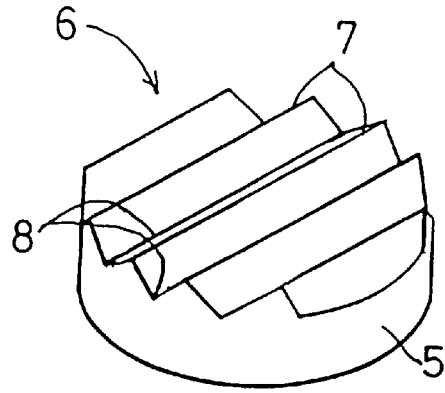
Figure 12:
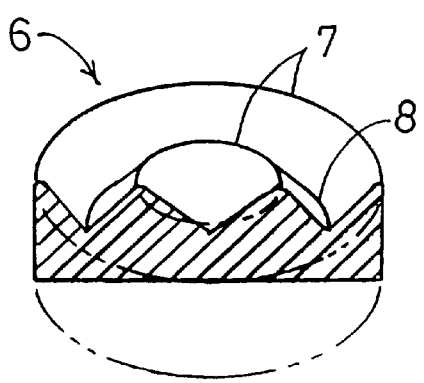
Figure 13:
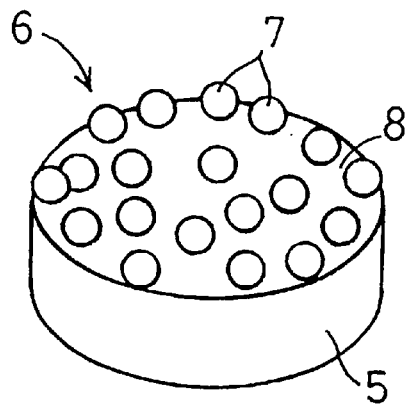
Figure 14:
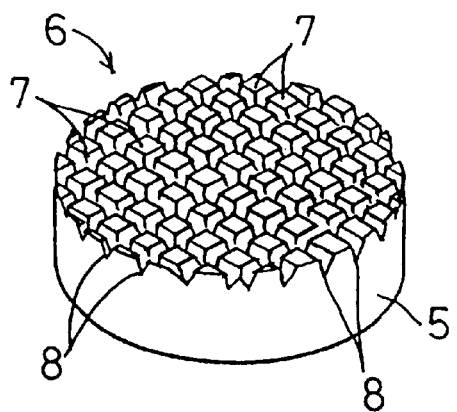
Figure 15:
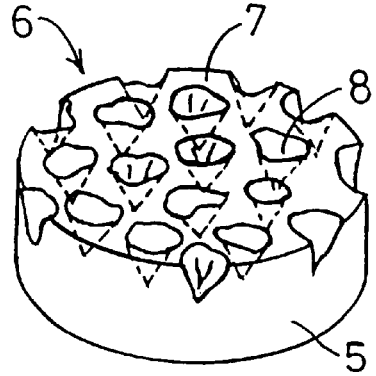

<3> For forming the convex portions 7 in the contacting end 6 of the spacer 5, as illustrated in FIG. 10 for example, the spacer forming paste 11 may be prepared by adding, to the low-melting glass, particles of convex-portion forming material 12 (e.g. silicon oxide, aluminum oxide) having a higher heat-resistant temperature than the softening temperature of the pre-spacer forming element 9. With this, when the glass fit is fused in the course of baking of the past-formed member 10, the particles of the convex-portion forming material 12 will hardly be deformed in the course of vaporization of the binder. Hence, the convex portions 7 made of the convex-portion forming material 12 will be formed in the pre-spacer forming element 9. As this convex-portion forming material 12 does not soften at the softening temperature of the pre-spacer forming element, the material will maintain its projecting condition even after the height-adjusting shaping operation by pressing, thus forming the convex portions 7 at the contacting end 6.

Figure 18:
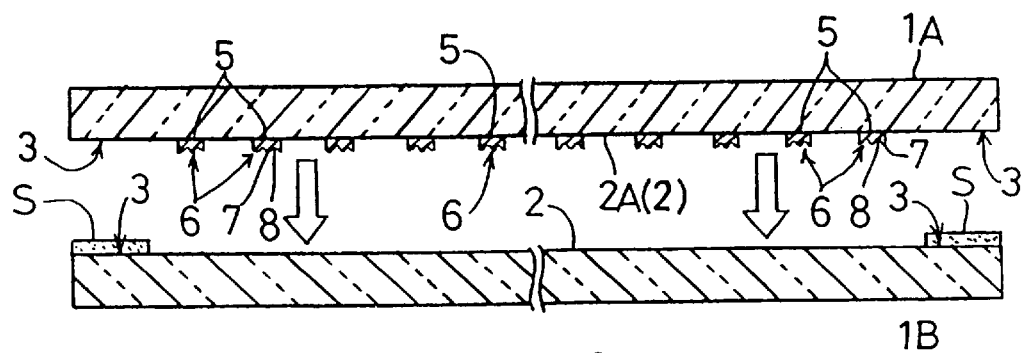
FIGS. 18 and 19 are section views illustrating another manufacturing method of the glass panel.

<4> For sealing the outer peripheral edge 3 of the glass sheet, as shown in FIG. 18 for example, if the printing technique is employed for the applying operation of the paste 11 made of the low-melting glass as the sealing material S for sealing the outer peripheral edge 3 of the glass panel P, the operation may be carried out in a labor-saving and speedy manner.

Figure 19:
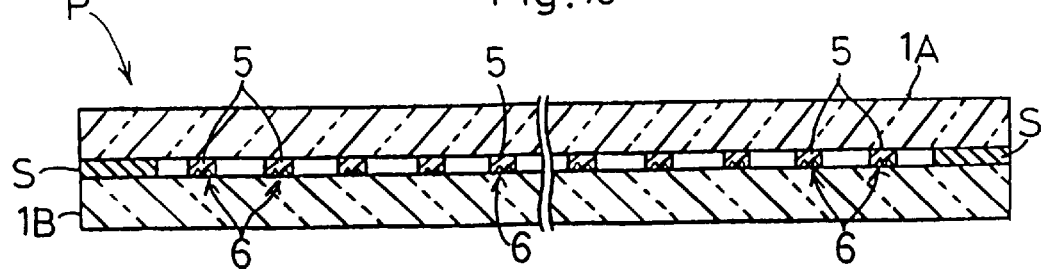

That is to say, as described in the foregoing embodiment, the screen printing method is utilized not only for the disposing operation of the paste 11, but also for the disposing operation of the sealing material S. In this case, on the spacer-disposing face 2A of the first glass sheet 1A, the pre-spacer forming elements 9 will be fixedly disposed in advance in the height-adjusting shaped condition and also the glass paste made of the low-melting glass for forming the sealing material S will be printed in advance along the entire outer peripheral edge 3 of the second glass sheet 1B (see FIG. 18). Thereafter, the two glass sheets 1A, 1B will be assembled together inside the vacuum furnace (see FIG. 19). Hence, the continuous manufacture of the glass panels P becomes possible, and mass production thereof may be readily realized.

In the above, it is advantageous that the glass paste for forming the sealing material S be disposed with a slightly greater thickness than the height of the spacer 5. This is because the glass panel may be pressed subsequently when the two glass sheets 1A and 1B are assembled together and also because certain amount of shrinkage is expected in the course of the baking operation of the glass paste.

Incidentally, although it is possible to employ the mere low-melting glass as the glass frit constituting the glass paste, if crystallized glass is employed instead like the foregoing embodiment, both the spacer 5 and the sealing material S may be formed of the same type of glass and also increased strength may be expected as well.

<5> The sealing operation in the vacuum furnace may be carried out in a still different method as follows. First, the spacer-forming paste 11 is printed on the spacer-disposing face 2A of the first glass sheet 1A and then subjected to the height-adjusting shaping operation, whereby a plurality of height-adjusted paste-formed members 10 are disposed on the first glass sheet 1A. On the other hand, glass paste as the sealing material S is printed, in a thickness greater than the height of the paste-formed members 10, along the outer peripheral edge 3 of the face 2 of the second glass sheet 1B on the side of the space 4. Then, these glass sheets 1A, 1B are brought into opposition to each other with the faces 2 thereof on the side of the space 4 being maintained at a distance greater than the space 4 and are kept inside the vacuum furnace maintained at the baling temperature of e.g. 400–600° C., thereby to defoam the two glass pastes and also to fuse the glass frit, and the two glass sheets 1A, 1B are subjected to radial cooling while they are kept pressed against each other, with the sealing material S being placed in abutment against the spacer-disposing face 2A of the first glass sheet 1A, whereby the glass panel P is formed.

In the above, since the paste as the sealing material S is applied in the thickness greater than the height of the paste-formed members 10, the other ends of the paste-formed members 10 will not be pressed against the second glass sheet 1B, so that there occurs no such inconvenience as deformation of the convex portions 7 of the contacting ends 6.

According to the manufacturing method described above, the space 4 of the glass panel P is maintained at the vacuum degree inside the furnace when the glass is baked therein. So that, the inside of the space of the formed glass panel P may be maintained at a pressure lower than that inside the furnace. This is because the inside of the space 4 may be further pressure-reduced by being cooled after the sealing thereof. Also, since the baking operation of the spacers 5 and the sealing operation with the sealing material S are effected simultaneously, the operational efficiency will be improved, and moreover a plurality of glass panels P may be formed inside the furnace at one time.

Incidentally, by raising the heating temperature during the defoaming operation about 20–30° C. higher the baking temperature, the defoaming process may be promoted, so that the time required for the defoaming process may be reduced. Accordingly, if the vacuum heating system is provided, the operational costs may be reduced significantly.

<6> In the foregoing, the spacer-forming paste 11 is disposed by the printing method. The pre-spacer forming elements 9 may be formed in the like manner of the foregoing embodiment. Namely, a binder is added to the powder low-melting glass having a lower fusing temperature than the softening point of the glass sheets and then mixed and kneaded together, thereby to prepare the spacer-forming paste 11. Then, this spacer-forming paste 11 is disposed, by means of a dispenser or the like, on the spacer-disposing face 2A of the first glass sheet 1A, so as to form the past-formed members 10 thereon. In this case, preferably the height-adjusting shaping operation is effected on these paste-formed members 10, as such operation may improve the shape of the pre-spacer forming elements 9.

Figure 20:
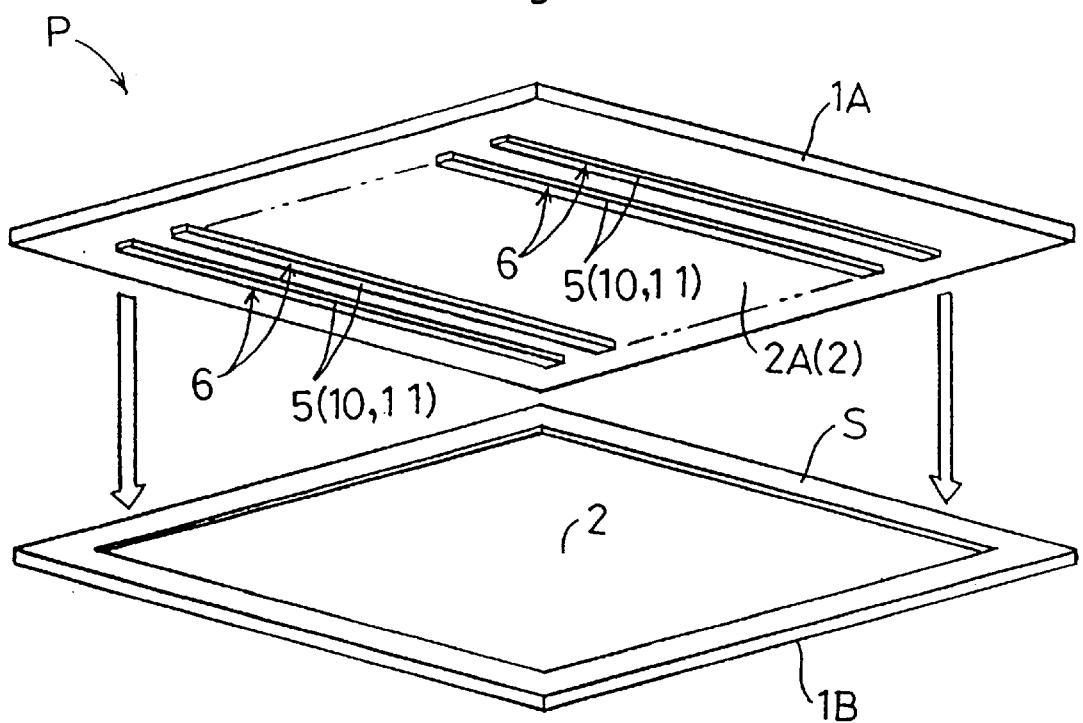
FIGS. 20 and 21 are process-descriptive views illustrating another manufacturing method of the glass panel.
Figure 21:
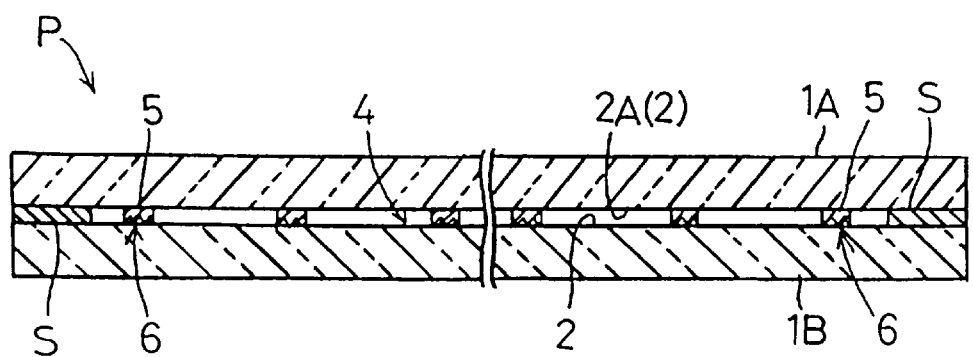

<7> In the foregoing, the paste-formed members 10 are arranged in the form of grating. Instead, for disposing this spacer-forming paste 11 on the first glass sheet 1A by using a dispenser or the Bike as is the case with the (6) above, as illustrated in FIG. 20 for instance, the spacer-forming paste 11 may be discharged in the form of lines onto the spacer-disposing face 2A and the peripheral sealing material S may be discharged onto the second glass sheet 1B and then baked. For instance, the paste will be discharged in the form of straight lines or wires having a wire diameter of 0.4 mm and in the spacing of e.g. 40 mm on the spacer-disposing face 2A in correspondence with the first glass sheet 1A (see FIG. 21) and then baked. Thereafter, this paste will be subjected to the height-adjusting shaping operation by means of a grooved roller, thereby to form the convex portions 7 corresponding to the groove bottoms of the grooved roller. Then, these convex portions 7 will be brought into abutment against the face 2 of the second glass sheet 1B on the side of the space 4.

<8> In the foregoing embodiment, the spacer-forming paste 11 is screen-printed on the spacer-disposing face 2A of the glass sheet 1. However, the specific method of printing the paste 11 on the glass face 2A may be selected as desired. For instance, the surface printing, copperplate printing, lithography, etc. may be employed.

Further alternatively, a photosensitive film may be formed on the glass sheet face 2A and to this film beam may be irradiated at portions thereof where the spacers 5 are to be disposed. Then, after the photosensitive portion is removed, the paste 11 is applied, then baked. With this baling, any remaining film may be eliminated. Other printing methods utilizing some functional film may be employed also.

<9> In the foregoing, the paste-formed members 10 are disposed only on the first glass sheet 1A Instead, the paste-formed members 10 may be formed on the space-side faces 2 of both of the glass sheets 1A, 1B for disposing the spacers 5. That is to say, the faces 2 on the side of the space 4 of both the first and second glass sheets 1A, 1B will be provided as the spacer-disposing faces 2A.

Figure 22:
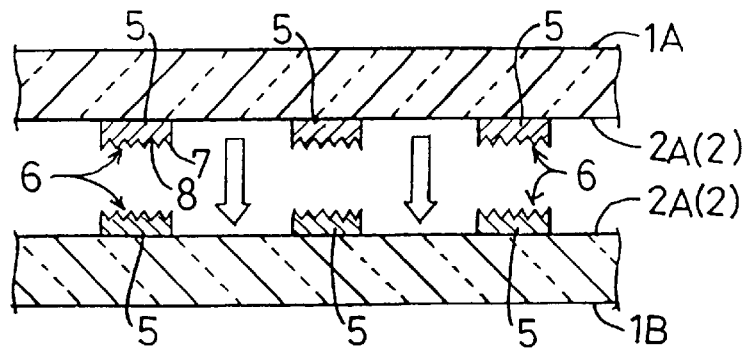
FIGS. 22 and 23 are process-descriptive views illustrating another manufacturing method of the glass panel.
Figure 23:
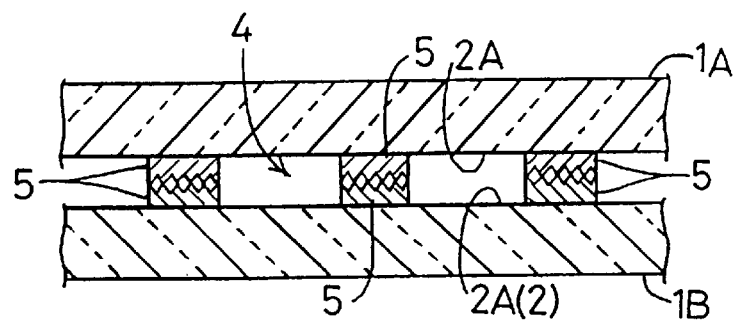

For instance, as shown in FIGS. 22 and 23, the spacer-formed members 10 will be arranged at mutually opposed positions on the respective spacer-disposing faces 2A of the two glass sheets 1A, 1B to form the spacers; and the convex portions 7 and the concave portions 8 will be formed in the contacting ends 6 of the respective spacers 5 and the corresponding opposed contacting ends 6 will be brought into contact with each other. According to this construction, the opposed spacers 5, 5 will come into contact with each other via their convex portions 7, whereby the resistance against heat conduction via the spacers 5 may be increased advantageously.

Figure 24:
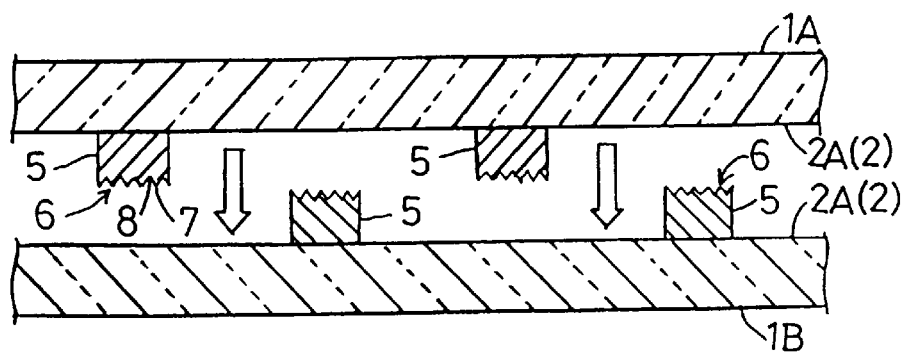
FIGS. 24 and 25 are process-descriptive views illustrating another manufacturing method of the glass panel.
Figure 25:
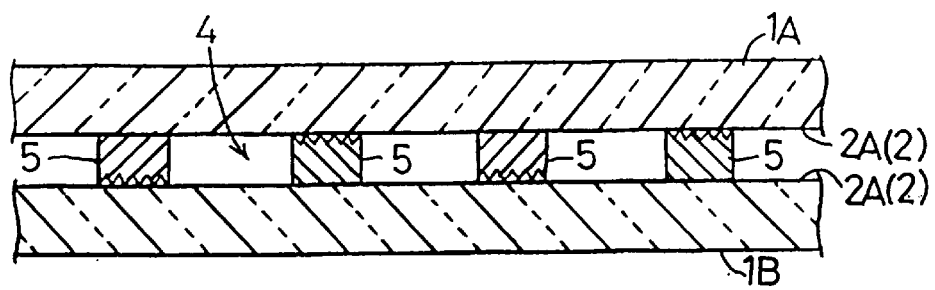

Further, as shown in FIGS. 24 and 25, the spacers 5 disposed on the spacer-disposing faces 2A of the two glass sheets 1A, 1B may be displaced with offset relative to each other, so that the contacting ends 6 of the respective spacers 5 may come into contact with the opposed space-side face 2.

<10> The glass sheet is not limited to the glass sheet having the thickness of 3 mm described in the foregoing embodiment, but may be of a glass sheet having a different thickness. Further, the type of glass may be selected as desired. For instance, it may be figured glass, frosted glass (glass which is surface-treated for obtaining function of diffusing light), wire glass, tempered glass, glass sheet provided with the function of heat-absorption, UV-absorption, heat-reflection, or any combination of these.

<11> Also, as for the composition of the glass, soda silica glass (soda-lime glass), boric silicate glass, aluminosilicate glass or various kinds of crystallized glass may be employed also.

<12> The glass sheets are not limited to those in which the first glass sheet 1A and the second glass sheet 1B differ from each other in the length or width thereof. They may be of same dimensions. And, these two glass sheets 1A, 1B may be superposed with the end edges thereof being aligned with each other. Further, the glass panel P may be comprised of first and second glass sheets 1A, 1B which differ in the thickness thereof.

Second Embodiment

A glass panel relating to the present invention may be alternatively constructed as follows.

Figure 26:
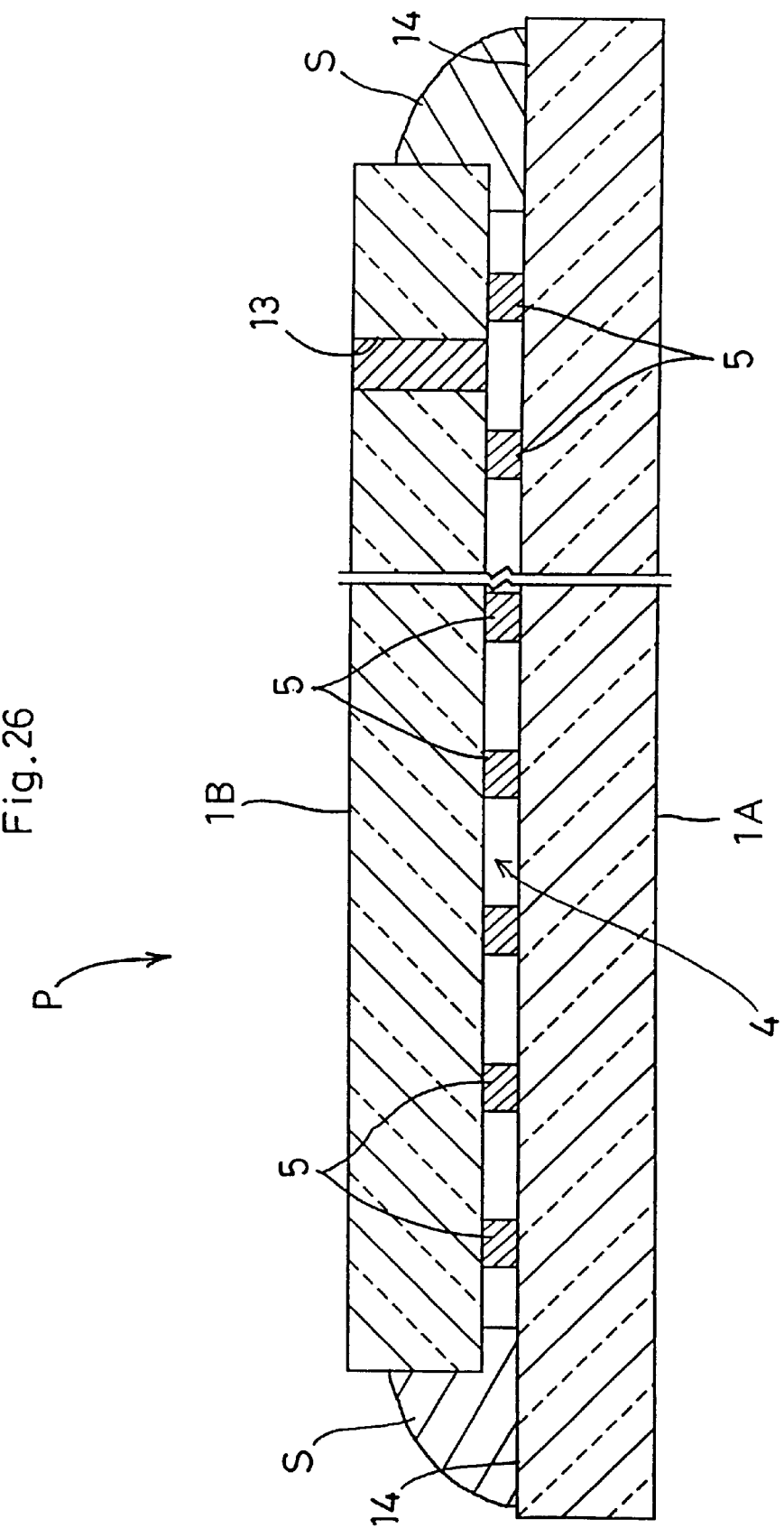
FIG. 26 is a section view showing principal portions of a glass panel relating to a second embodiment.

FIG. 26 shows a glass panel P, in which a plurality of spacers 5 are interposed between a pair of first glass sheet 1A and second glass sheet 1B having sheet faces thereof opposed to each other so as to form a space 4 between these glass sheets 1A, 1B and outer peripheral edges of the two glass sheets 1A, 1B are bonded together with a sealing material S made of e.g. low-melting glass so as to seal the space 4.

The two glass sheets 1A, 1B are transparent float plate glass (720° C. softening point) having thickness of about 3 mm. The glass sheet 1A is formed with slightly larger outer dimensions (306 mm×306 mm) than the outer dimensions (300 mm×300 mm) of the second glass sheet 1B so that when the sheet faces of the two glass sheets 1A, 1B are placed in opposition to each other the entire peripheral edges of the first glass sheet may form projecting portions 14 which project along the direction of sheet faces from the peripheral edges of the second glass sheet 1B.

Next, there will be described a method of manufacturing the above-described glass panel P under the atmospheric pressure environment, with reference to FIGS. 27 through 31.

First, a through hole 13 for pressure reduction is formed in advance in either one of the first and second glass sheets 1A, 1B. This through hole 13 may be positioned where the sheets are bonded together with the sealing material S or may be elsewhere as well.

In this second embodiment, the spacers 5 are disposed on the first glass sheet 1A However, the methods of forming these spacers 5 are same as those described in the first embodiment.

Incidentally, the composition of the spacer-forming paste 11 employed in this second embodiment is shown in Table 1 below.

TABLE 1

| Composition of Spacer-forming Paste | |
|---|---|
| | wt. % |
| glass component | 64 |
| crystal particle powder component | 20 |
| resin component | 5 |
| oil | 11 |

The glass component contained in the spacer-forming paste 11 has a fusing temperature (the temperature at which the glass is fluidized, generally its viscosity becomes lower than $10^5$ poise) of 590° C. which is lower than the softening pint (720° C.) of the glass sheets 1A, 1B and a softening point of 550° C. which is higher than the fusing temperature (440° C.) of the sealing material S3. The composition of this glass component is shown in Table 2 below.

TABLE 2

| Composition of Glass Component | |
|---|---|
| | wt. % |
| PbO | 54 |
| SiO$_2$ | 32 |
| alkali | 8 |
| Al$_2$O$_3$ | 3 |
| TiO$_2$ | 3 |

Further, the composition of the crystal particle powder component is shown in Table 3 below.

TABLE 3

| Composition of Crystal Particle Powder Component | |
|---|---|
| | wt. % |
| CoO | 50 |
| Fe$_2$O$_3$ | 30 |
| MnO$_2$ | 20 |

Then, after the spacers 5 formed by the printing of the spacer-forming paste 11 are dried for a predetermined time period, they are subjected to a baking process in which the temperature inside the furnace is raised up to 590° C. at the rate of 5° C. per minute, they are then maintained for 30 minutes at this temperature, and then they are solidified by being cooled at the rate of 2° C. per minute, whereby the spacers 5 are formed as being fused on the glass sheet 1A.

Next, as shown in FIGS. 27 through 31, the peripheral edges of the glass sheets 1A, 1B opposed to each other across the baked spacers 5 therebetween are bonded together with the sealing material S to seal the space 4. Then, this space 4 is pressure-reduced and the through hole 13 is sealed.

Figure 27:
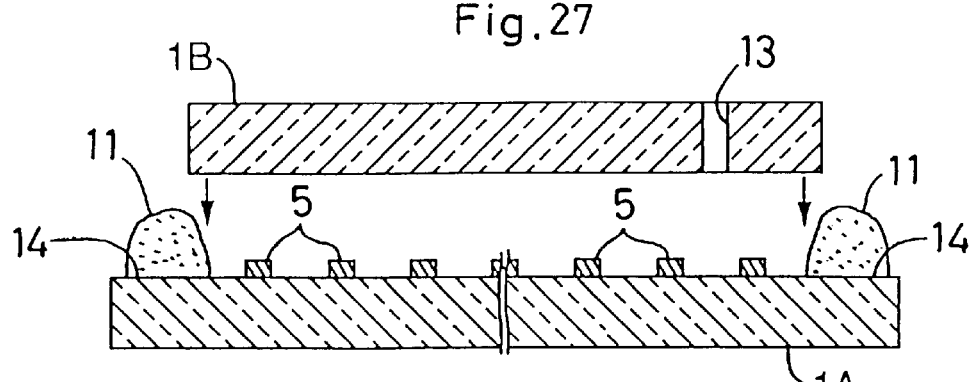
FIGS. 27 through 31 are descriptive views illustrating a manufacturing process relating to the second embodiment.
Figure 28:
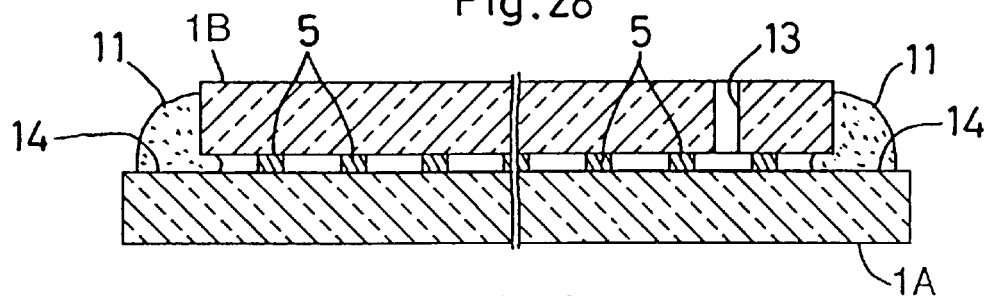

That is to say, as shown in FIG. 27, after the paste 11 containing the glass component is applied to the projecting portions 14 of the first glass sheet 1A, the first glass sheet 1A and the second glass sheet 1B are superposed on each other across the spacers 5, as shown in FIG. 28.

The paste 11 is to be subjected to a baking process to be described later to form the sealing material S. Its composition is shown in Table 4.

TABLE 4

| Composition of Paste | |
|---|---|
| | wt. % |
| glass component | 60 |
| crystal particle powder component | 3 |
| resin component (ethyl cellulose) | 0.2 |
| oil | 7 |

The glass component contained in the paste 11 has a fusing temperature of 440° C. The composition of the paste 11 is shown in Table 5 below.

TABLE 5

Composition of Glass Component Contained in Paste

| | wt. % |
|---|---|
| PbO | 80 |
| $B_2O_3$ | 12 |
| $SiO_2$ | 0.1 |
| ZnO | 6 |
| $Al_2O_3$ | 2 |

Incidentally, as may be apparent from Table 2 and Table 5, the paste 11 contains a glass component which has a lower lead content and a higher silicon content.

Further, the composition of the crystal particle powder component is shown in Table 6 below.

TABLE 6

Composition of Crystal Particle Powder Component

| | wt. % |
|---|---|
| zircon | 30 |
| cordierite | 20 |
| lead titanate | 50 |

Figure 29:
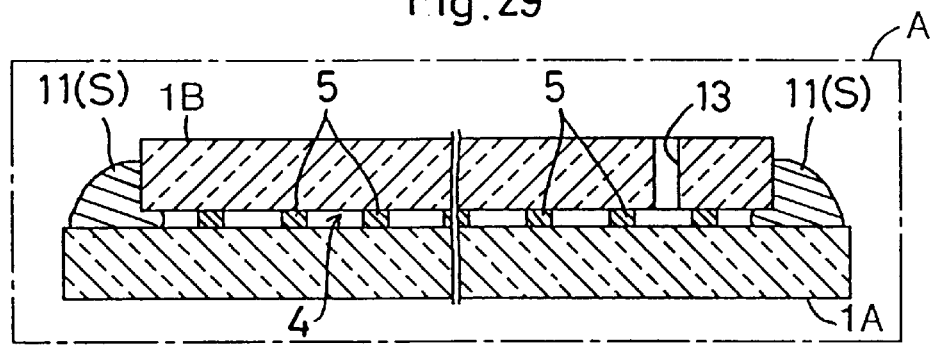

And, after the paste 11 is dried for a predetermined time period, as shown in FIG. 29, a baking operation is effected in which the temperature inside the heating furnace A is raised up to 450° C. at the rate of 5° C. per minute and kept at this temperature for 30 minutes and then is lowered at the rate of 2° C. per minute. Whereby, the peripheral edges of the first glass sheet 1A and the second glass sheet 1B are bonded together with the sealing material S and the space 4 is sealed.

Figure 30:
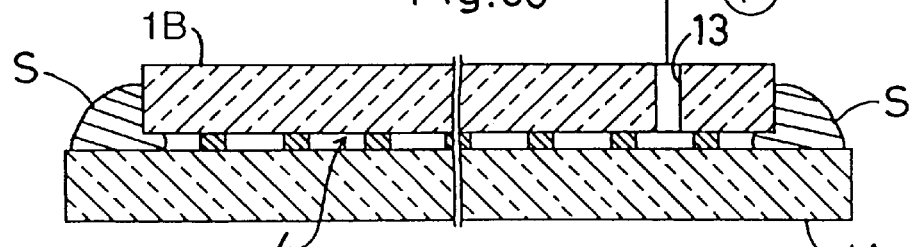
Figure 31:
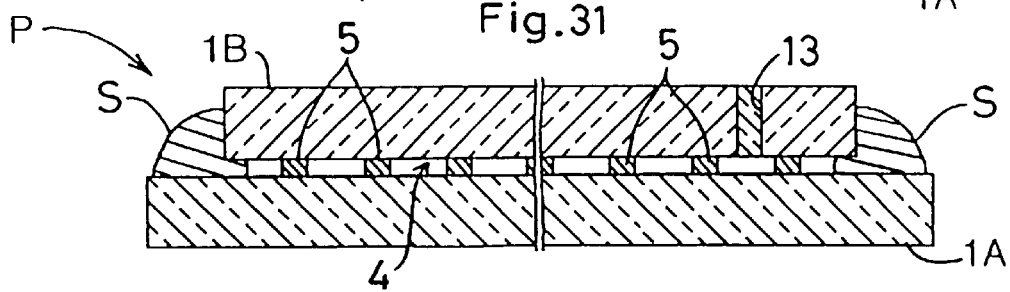

Next, as shown in FIGS. 30 and 31, the air present in the space 4 is evacuated through the through hole 13, to achieve a pressure-reduced environment (below $1.0 \times 10^{-2}$ torr, more preferably, below $1.0 \times 10^{-4}$ torr), then, this through hole 13 is sealed.

Incidentally, this sealing operation may be conducted under the pressure-reduced environment. In this case, though not shown, the glass sheets 1A, 1B superposed each other across the spacers 5 therebetween will be heated under the pressure-reduced environment inside the vacuum furnace up to a temperature lower than the softening temperature of the glass component constituting the spacers 5. Then, after the paste 11 is fused, the temperature is lowered to the normal temperature, whereby the solidified sealing material S seals the space 4 under the pressure-reduced condition.

In this second embodiment, the glass panel may be constructed alternatively as described below. <1> The glass panel P is not limited to the one described in the foregoing embodiment in which the spacers 5 are provided by baking the paste 11 containing the glass component. Instead, the panel may employ spacers 5 which are formed by baking of paste 11 containing such glass component as Ca, Mg, Ta, Bi, Cd, Ba, etc.

<2> In the foregoing embodiment, after the paste 11 is applied to the projecting portions 14 of the first glass sheet 1A, the glass sheets 1A, 1B are superposed each other and the peripheral edges of these glass sheets 1A, 1B are bonded together with the sealing material S. Alternatively, the paste 11 may be fed by means of a volumetric feeding device such as a dispenser between the peripheral edges of the glass sheets 1A, 1B after these glass sheets 1A, 1B are superposed each other, so that the peripheral edges may be bonded together with the sealing material S.

<3> Incidentally, in this second embodiment too, the same constructions <10> through <12> described hereinbefore in the description relating to the first embodiment may be employed.

Third Embodiment

Figure 32:
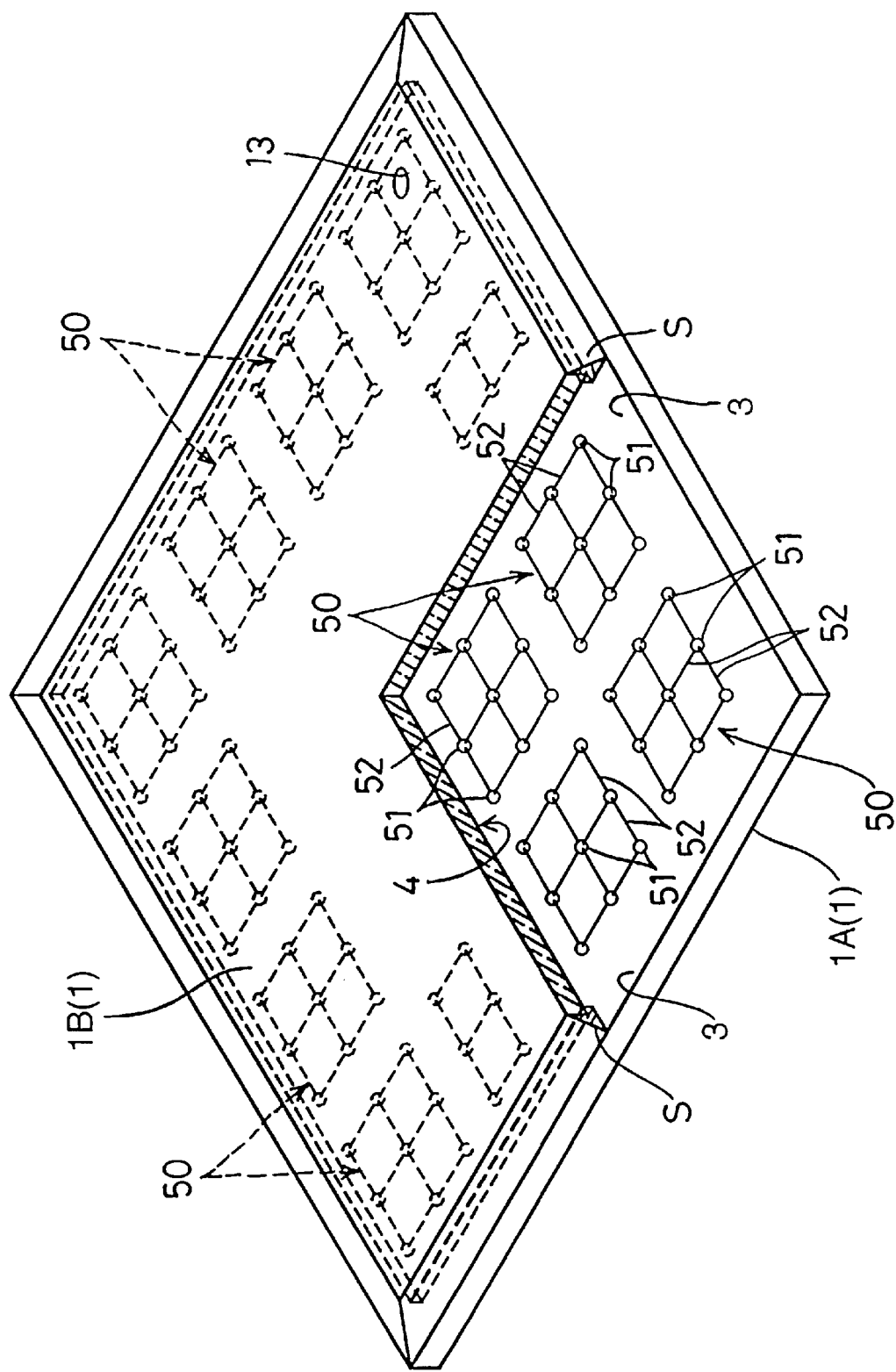
FIG. 32 is a perspective view showing the appearance of a glass panel relating to a third embodiment.
Figure 33:
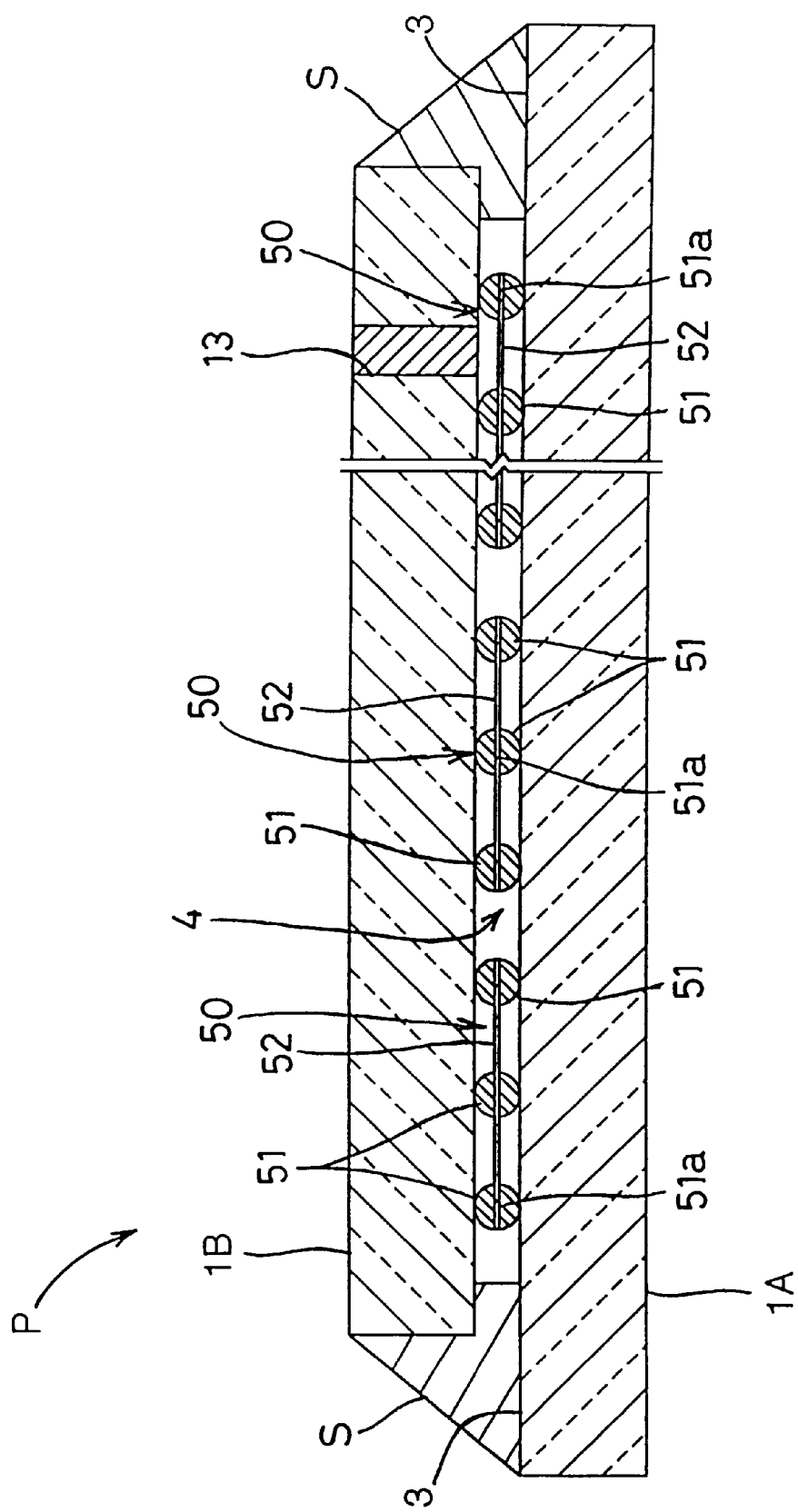
FIG. 33 is a section view of the glass panel relating to the third embodiment.
Figure 34:
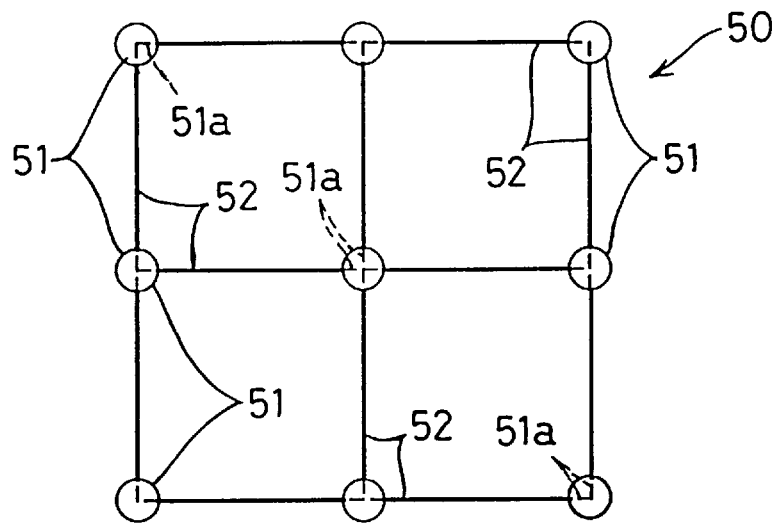
FIGS. 34 through 36 are descriptive views showing appearances of various kinds of spacers relating to the third embodiment.
Figure 35:
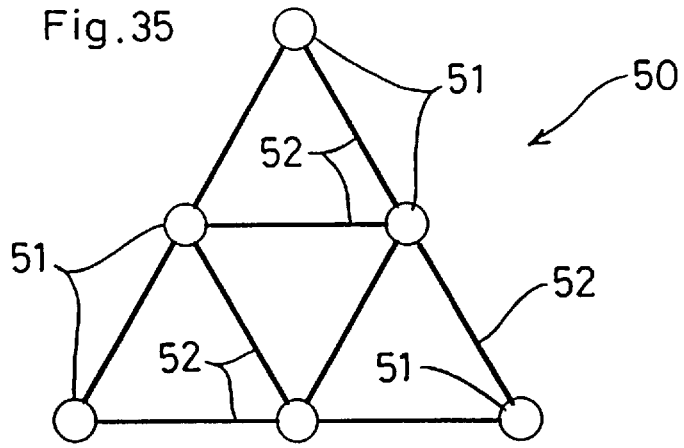
Figure 36:
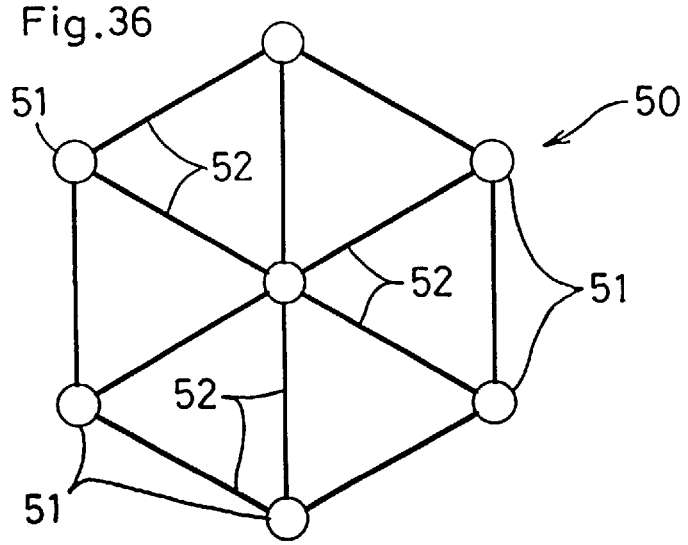

A spacer 50 for use in a glass panel P relating to this embodiment, as shown in FIGS. 32 and 33 is similar to those in the foregoing embodiment in that it is to be interposed between the first glass sheet 1A and the second glass sheet 1B having their sheet faces opposed to each other. However, this third embodiment employs such spacer 50 as shown in FIGS. 34 through 36 for instance.

This spacer 50 comprises a plurality of spacer bodies 51 interconnected in a two-dimensional form via connecting members 52. Of these, the each spacer body 51 is employed as a member for coming into contact with the first glass sheet 1A and the second glass sheet 1B for forming the space 4 therebetween.

This spacer body 51 is formed of any material which is hardly deformed or collapsed when being bound between the first glass sheet 1A and the second glass sheet 1B and is capable of maintaining constant the distance between the first glass sheet 1A and the second glass sheet 1B. Its shape is not particularly limited. The shape may be e.g. spherical, cubic, rectangular, hollow cylindrical, solid cylindrical, or it may be any other complicated shape as well.

The size of this spacer body 51 will be appropriately set, depending on the distance to be secured between the first glass sheet 1A and the second glass sheet 1B.

As for the material of this spacer body 51, it is preferred that the material have a required strength, high-temperature resistance, low heat-conductivity, good workability, etc. For example, it may be made of such metals or alloys thereof as nickel, molybdenum, tungsten, tantalum, titanium, aluminum, iron, steel, stainless steel, inconel or ceramics, minerals, carbon fibers, etc.

On the other hand, the connecting member 52 is a member for two-dimensionally interconnecting the plurality of spacer bodies 51 together. And, this is used for connecting together a predetermined number of spacer bodies 51 to be disposed within a predetermined area on the glass sheet 1. By interconnecting the plurality of spacer bodies 51 in this manner, the plurality of spacer bodies 51 may be disposed at one time at the predetermined positions, whereby the disposing operation of the spacer 50 may be carried out efficiently.

The connecting member 52 may be of various shapes. For instance, as shown in FIGS. 34 through 36, it may be formed in the shape of line. By using this connecting member 52, a plurality of spacer bodies 51 are interconnected with each other as being distributed within the area having the predetermined planar shape or area. For instance, they are interconnected in rectangular, triangular or hexagonal pattern, as shown in FIGS. 34 through 36, respectively.

The connection between each spacer body 51 and the connecting member 52 may be realized in various ways. One way is to define a connecting hole 51a in the spacer body 5, into which hole one end of the connecting member 52 is inserted to be engaged or bonded thereto. Another way is to simply bond the end of the connecting member 52 with the spacer body 51, without modifying the spacer body 51 in particular.

Then, by disposing a plurality of spacers 50 constructed as above, the spacer bodies 51 may be disposed over the entire face of the glass sheet 1 having any area and/or shape.

The diameter of the connecting member 52 provided in the form of line is set smaller than the distance between the first glass sheet 1A and the second glass sheet 1B, so as to facilitate the evacuation of the air inside the space 4 when this space 4 is pressure-reduced.

If the connecting member 52 is provided in the shape of line, this will reduce not only the amount of the material used in forming this connecting member 52, but also the weight of the spacer 50. Accordingly, there are achieved advantages in terms of economy or handling ease.

The connecting members 52 may be left there after the spacer 50 is disposed. However, they may be removed also.

In case the connecting member 52 is to be left, it may be made of such material as metals such as stainless steel, aluminum, or carbon fiber, etc. In this case, as the connecting member 52 is provided with a certain amount of rigidity, this will prevent disadvantageous irregularity in the mutual positioning of the spacers 5 interconnected with each other.

Further, the connecting member 52 which is to be left may be made of any material which is shrunk due to heating or the like.

In either case, it is believed preferable that such connecting member 52 to be left be made in the form of line. For, if it is formed like line, the remaining connecting member 52 may be less conspicuous.

On the other hand, in case the connecting member 52 is to be removed, this connecting member 52 should be made of any material which can be eliminated through combustion by heating e.g. the first glass sheet 1A or through evaporation or which can be dissolved by injection of various solvents into the space 4 prior to the heating of e.g. the first glass sheet 1A.

For example, the material which can be eliminated through combustion may be natural fibers, polymer-containing organic fibers, etc. The material which can be eliminated through evaporation may be such material which can be easily evaporated such as naphthalene, camphor, dry ice, or ice, etc. The material which can be eliminated through dissolution may be fibers of various synthetic resins, or water-solvent material such as soap, oblate, etc.

Figure 37:
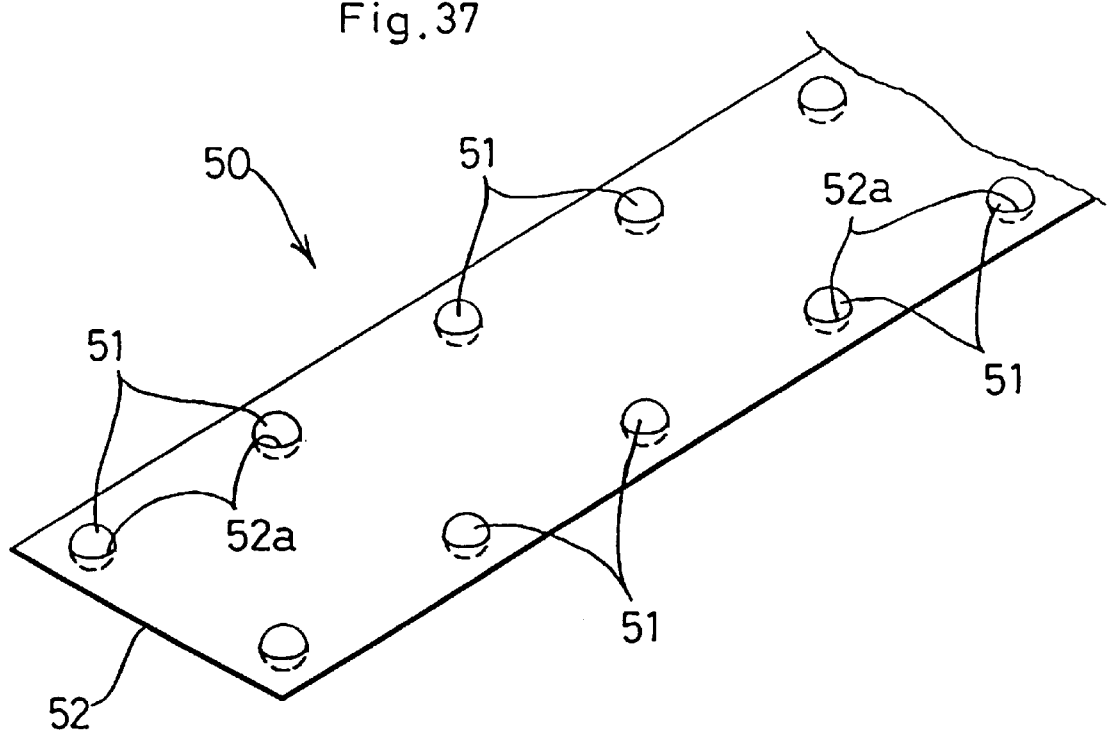
FIGS. 37 and 38 are descriptive views showing appearances of various kinds of spacers relating to the third embodiment.
Figure 38:
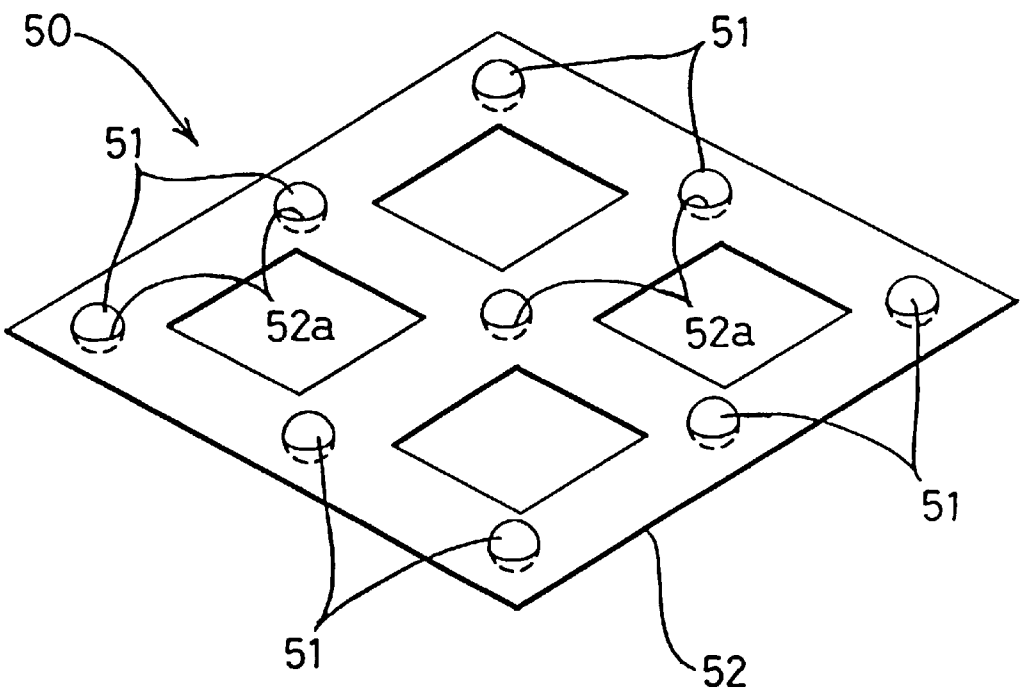

In addition to the above-described embodiments, the connecting member 52 may be provided in the form of thin strips as shown in FIG. 37 or in the form of sheet as shown in FIG. 38.

In these cases too, it may be freely determined whether to have this connecting member 52 remain or eliminated. If it is to remain, this connecting member 52 may be utilized as an ornament of the glass panel P. If it is to be eliminated, the panel may be used as an ordinary glass panel P having transparency.

For connecting this connecting member 52 with the spacer body 51, it is conceivable, for instance, to define a hole 52a in advance at a predetermined position of the connecting member 52 in the form of sheet and then to fit and bond the spacer body 51 at the hole 52a, or to dispose the spacer bodies 51 in advance at the predetermined positions and then to form the connecting member 52 in the form of a film so as to interconnect the respective spacer bodies 51.

Such planar connecting member 52, whether it is to remain or be eliminated, may be formed of the same material as the linear connecting member 52 described above.

The thickness of the connecting member 52 should be set smaller than the distance between the first glass sheet 1A and the second glass sheet 1B so as to facilitate the pressure-reducing operation of the inside of the space 4. The thinner the connecting member 52, the smaller amount of material may be used for forming the same, whereby it may be lighter-weight. Hence, there will be achieved the advantages in terms of economy and handling ease, just like the above-described case of the connecting member 52 provided in the form of line.

The manufacturing method of the glass panel using this spacer 50 of the invention is substantially same as that of the foregoing embodiment. In this third embodiment, there will be described an example of the method of manufacturing the glass panel P under the atmospheric pressure environment, with reference to FIGS. 39 through 41.

Figure 39:
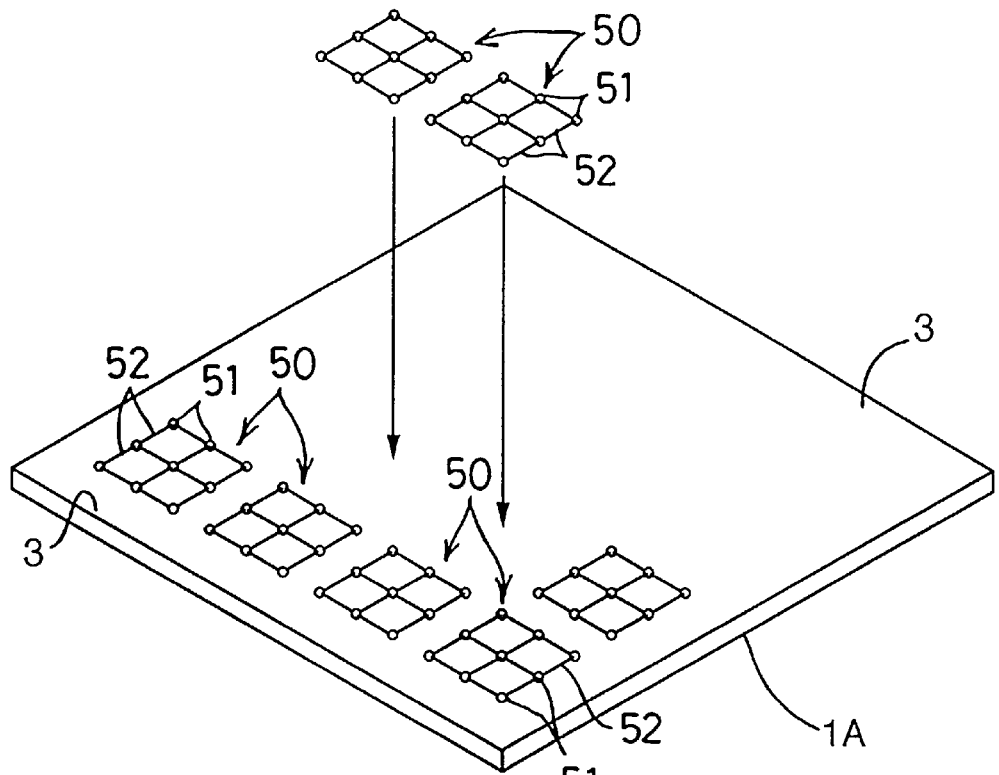
FIGS. 39 through 41 are section views illustrating the manufacturing process of the glass panel relating to the third embodiment.

[1] As illustrated in FIG. 39, the spacers 50 are appropriately disposed on the upper face of the first glass sheet 1A which is disposed horizontally. This disposing operation can be easily done by a worker's manual operation. In this case, the respective spacers 50 should be disposed with use of an appropriate ruler or the like so that the adjacent spacers 50 may be disposed in good order.

No special bonding or the like is provided between the spacers 50 and the first glass sheet 1A. This is because even without bonding therebetween evacuation of the air from the space 4 causes the first and second glass sheets 1A, 1B to firmly bind the respective spacer bodies 51 therebetween, whereby the spacer bodies 51 may be reliably retained.

Incidentally, when the spacers 50 are to be disposed automatically, though not shown, the spacers 50 may be disposed in an efficient manner by using e.g. an automatic conveyer apparatus or the like. This automatic conveyer apparatus may comprise e.g. a suction type operable to suck each spacer body 51 or a lift type operable to hook and lift up the plurality of connecting members 52.

Figure 40:
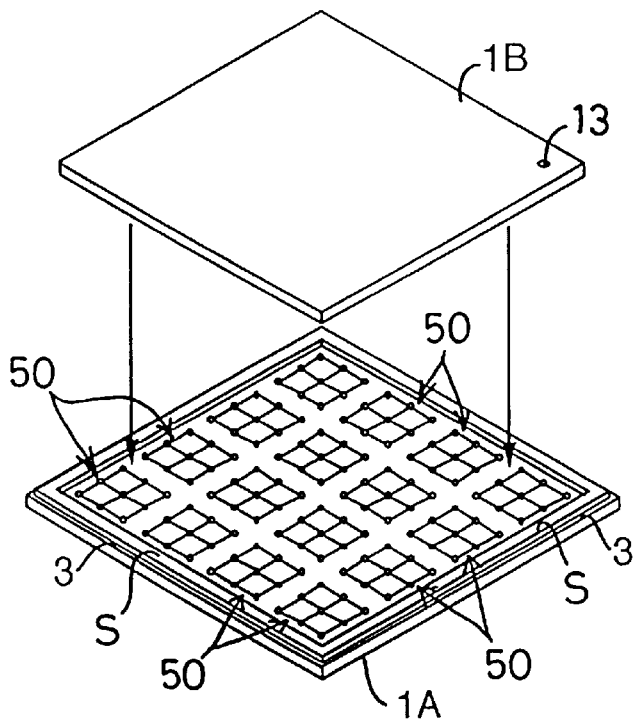

[2] As illustrated in FIG. 40, the disposed conditions of the spacers 50 are confirmed and then the second glass sheet 1B is superposed onto the first glass sheet 1A And, the sealing material S made of e.g. low-melting glass is applied to the outer peripheral edge 3 of the first glass sheet 1A.

Incidentally, this application of the sealing material S may be done before the second glass sheet 1B is superposed onto the first glass sheet 1A.

In this second glass sheet 1B, an air evacuating portion 4 is formed in advance. This air evacuating portion 4 may be in the form of a through hole 13 formed to communicate with the inside and the outside of the space 4.

Figure 41:
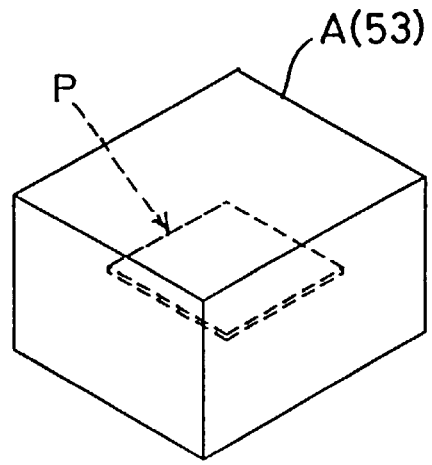
Figure 42:
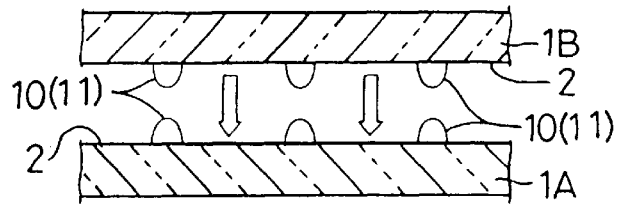
FIGS. 42 through 44 are section views illustrating a manufacturing method of a glass panel proposed by the prior art.
Figure 43:
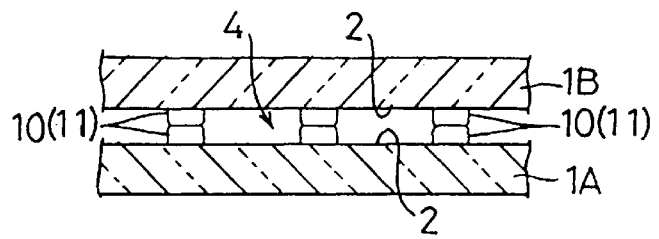
Figure 44:
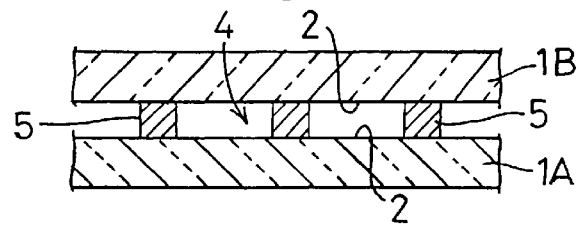
Figure 45:
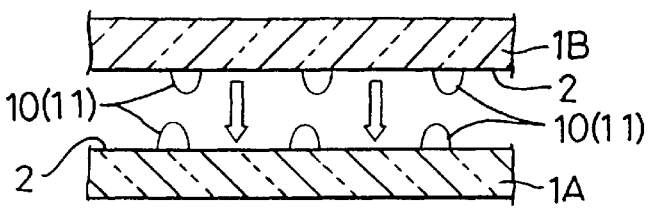
FIGS. 45 through 47 are section views for illustrating problems inherent in the conventional glass panel manufacturing methods.
Figure 46:
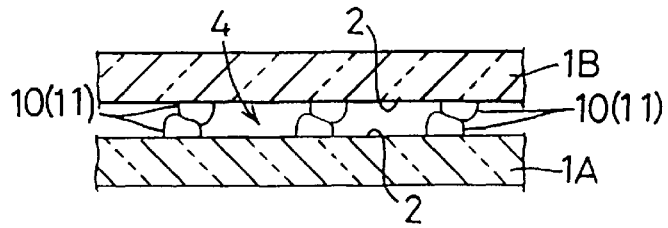
Figure 47:
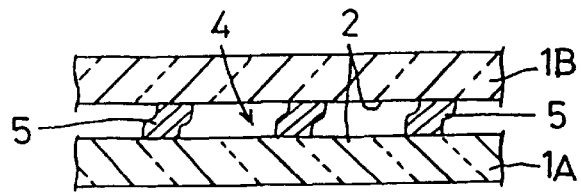

[3] Next, as illustrated in FIG. 41, these first and second glass sheets 1A, 1B are heated in a heating furnace A up to a temperature higher than the fusing point of the sealing material S, thereby to fuse this sealing material S. This heating temperature ranges approximately at 300 to 500° C. Thereafter, the temperature is lowered again to the normal temperature, whereby the outer periphery of the space 4 is sealed with the sealing material S.

If the connecting member 52 is adapted to be shrinkable or removable by heating, the shrinking/removing operation is effected in the course of this step.

Incidentally, in case the connecting member 52 is adapted to be dissolvable by means of a solvent, a predetermined solvent will be injected into the space 4 prior to the heating operation by the heating furnace A, so as to dissolve this connecting member 52. By effecting the heating step thereafter, any solvent remaining inside the space 4 may be eliminated reliably.

[4] Further, the glass panel P is introduced into a vacuum vessel 53 or the like to evacuate the air present inside the space 4 through the communicating hole 13. In this case, it is assumed that the heating furnace A functions also as the vacuum vessel 53.

After the evacuation of air from the space 4, the communicating hole 13 is sealed with a sealing glass material or the like. Thereafter, the glass panel P is taken out of the vacuum vessel 53, whereby the glass panel P is completed.

By using the spacer 50 comprised of the plurality of spacer bodies 51 two-dimensionally interconnected via the connecting members 52 as in this third embodiment, the disposing operation of the spacer bodies 51 may be carried out very efficiently. As a result, the production efficiency of the glass panel P may be improved.

Further, if the spacer 50 for the glass panel P of the invention is adapted to be shrinkable or removable by heating or be dissolvable by a solvent, a glass panel P having good transparency may be obtained.

Incidentally, in this third embodiment, the glass panel P may be alternatively manufactured as follows.

(1) The manufacture of the glass panel P is not limited that conducted under the atmospheric pressure environment as described above. Instead, the entire manufacturing process may be done inside the vacuum vessel 53.

In this case too, the glass panel P will be manufactured in substantially identical process to that described hereinbefore. However, since there is no need of providing the communicating hole 13 in the second glass sheet 1B in this case, the trouble of working this second glass sheet 1B may be reduced and also the aesthetic appearance of the finished glass panel P may be further improved.

(2) Further, the disposing distance and arrangement of the spacers 50 may be appropriately determined, depending on the strength, thickness, flexion property of the glass sheets 1 and also the degree of pressure reduction of the space 4, etc.

INDUSTRIAL APPLICABILITY

The glass panel according to the present invention may be used in a variety of applications. For instance, it may be used for building construction, vehicles (wind shied of an automobile, railway train, marine vessel) and machine components (a surface glass of a plasma display, a door or wall of a refrigerator or heat insulating device), etc.

What is claimed is:

1. A glass panel comprises:

a pair of first and second glass sheets (1A, 1B) disposed with sheet faces thereof opposed to each other, a plurality of spacers (5) being interposed between the pair of glass sheets (1A, 1B) for forming a space (4) therebetween; and a sealing material (S) for bonding peripheral edges (3) of the glass sheets (1A, 1B) together for sealing the space (4), the sealing material having a lower fusing temperature than the softening point of the glass sheets;

wherein each spacer (5) is formed by disposing spacer-forming paste (11) in a predetermined shape on the sheet face of the glass sheet (1A, 1B) and then baling the paste (11), said spacer-forming paste (11) containing glass component which has a fusing temperature lower than the softening point of the glass sheets (1A, 1B) and a softening point higher than a fusing temperature of the sealing material (S).

2. A glass panel according to claim 1, wherein the spacers (5) are formed by baking the paste (11) which is disposed on the sheet face of the first glass sheet (1A) alone.

3. A glass panel according to claim 1 or 2, wherein the glass component contained in the paste (11) has a lower lead content and a higher silicon content than the sealing material (S).

* * * * *